(12) United States Patent
Qureshi

(10) Patent No.: US 9,455,886 B2
(45) Date of Patent: Sep. 27, 2016

(54) PROVIDING MOBILE DEVICE MANAGEMENT FUNCTIONALITIES

(71) Applicant: Citrix Systems, Inc., Fort Lauderdale, FL (US)

(72) Inventor: Waheed Qureshi, Pleasanton, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 14/032,643

(22) Filed: Sep. 20, 2013

(65) Prior Publication Data

US 2014/0297838 A1 Oct. 2, 2014

Related U.S. Application Data

(63) Continuation of application No. 14/025,898, filed on Sep. 13, 2013.

(60) Provisional application No. 61/863,629, filed on Aug. 8, 2013, provisional application No. 61/806,577, filed on Mar. 29, 2013.

(51) Int. Cl.
*G06F 15/173* (2006.01)
*H04L 9/32* (2006.01)
(Continued)

(52) U.S. Cl.
CPC .............. *H04L 43/04* (2013.01); *H04W 4/001* (2013.01); *H04L 12/4633* (2013.01); *H04L 47/20* (2013.01); *H04L 63/0272* (2013.01); *H04L 63/20* (2013.01)

(58) Field of Classification Search
CPC ... H04L 63/20; H04L 63/0272; H04L 63/10; H04L 12/4633; H04L 47/20

USPC ....... 709/223, 224, 238; 713/168; 726/1, 12, 726/16

See application file for complete search history.

(56) References Cited

U.S. PATENT DOCUMENTS

| 5,805,803 A | 9/1998 | Birrell et al. |
| 6,151,606 A | 11/2000 | Mendez |

(Continued)

FOREIGN PATENT DOCUMENTS

| EP | 1465039 A1 | 10/2004 |
| EP | 2403211 A1 | 1/2012 |

(Continued)

OTHER PUBLICATIONS

H. Hamed, E. Al-Shaer and W. Marrero, "Modeling and verification of IPSec and VPN security policies," 13th IEEE International Conference on Network Protocols (ICNP'05), 2005, pp. 10.*

(Continued)

*Primary Examiner* — Taylor Elfervig
(74) *Attorney, Agent, or Firm* — Banner & Witcoff, Ltd.

(57) ABSTRACT

Methods, systems, computer-readable media, and apparatuses for providing mobile device management functionalities are presented. In various embodiments, a mobile device management agent may monitor state information associated with a mobile computing device. The monitored state information may be analyzed on the mobile computing device and/or by one or more policy management servers. In some instances, the one or more policy management servers may provide management information to the mobile computing device, and the management information may include one or more commands (which may, e.g., cause the mobile computing device to enforce one or more policies) and/or one or more policy updates. Subsequently, one or more policies may be enforced on the mobile computing device based on the monitored state information and/or based on the management information.

20 Claims, 14 Drawing Sheets

(51) Int. Cl.
*H04L 29/06* (2006.01)
*G06F 9/00* (2006.01)
*G06F 7/04* (2006.01)
*H04L 12/26* (2006.01)
*H04W 4/00* (2009.01)
*H04L 12/46* (2006.01)
*H04L 12/813* (2013.01)

(56) References Cited

U.S. PATENT DOCUMENTS

| | | |
|---|---|---|
| 6,154,172 A | 11/2000 | Piccionelli et al. |
| 6,480,096 B1 | 11/2002 | Gutman et al. |
| 6,609,198 B1 | 8/2003 | Wood et al. |
| 6,621,766 B2 | 9/2003 | Brewer et al. |
| 6,751,738 B2 | 6/2004 | Wesinger, Jr. et al. |
| 6,859,879 B2 | 2/2005 | Henn et al. |
| 6,883,098 B1 | 4/2005 | Roman et al. |
| 7,043,453 B2 | 5/2006 | Stefik et al. |
| 7,065,652 B1 | 6/2006 | Xu et al. |
| 7,159,120 B2 | 1/2007 | Muratov et al. |
| 7,240,015 B1 | 7/2007 | Karmouch et al. |
| 7,254,831 B2 | 8/2007 | Saunders et al. |
| 7,269,605 B1 | 9/2007 | Nguyen et al. |
| 7,340,772 B2 | 3/2008 | Panasyuk et al. |
| 7,415,498 B2 | 8/2008 | Russo et al. |
| 7,437,752 B2 | 10/2008 | Heard et al. |
| 7,490,073 B1 | 2/2009 | Qureshi et al. |
| 7,490,352 B2 | 2/2009 | Kramer et al. |
| 7,496,954 B1 | 2/2009 | Himawan et al. |
| 7,502,861 B1 | 3/2009 | Protassov et al. |
| 7,509,672 B1 | 3/2009 | Horwitz et al. |
| 7,526,800 B2 | 4/2009 | Wright et al. |
| 7,529,923 B2 | 5/2009 | Chartrand et al. |
| 7,596,593 B2 | 9/2009 | Mitchell et al. |
| 7,599,991 B2 | 10/2009 | Vargas et al. |
| 7,665,125 B2 | 2/2010 | Heard et al. |
| 7,697,737 B2 | 4/2010 | Aull et al. |
| 7,716,240 B2 | 5/2010 | Lim |
| 7,761,523 B2 | 7/2010 | May et al. |
| 7,774,323 B2 | 8/2010 | Helfman |
| 7,779,408 B1 | 8/2010 | Papineau |
| 7,779,458 B1 | 8/2010 | Heiderscheit et al. |
| 7,788,535 B2 | 8/2010 | Bussa et al. |
| 7,788,536 B1 | 8/2010 | Qureshi et al. |
| 7,865,888 B1 | 1/2011 | Qureshi et al. |
| 7,904,468 B2 | 3/2011 | Neil et al. |
| 7,950,066 B1 | 5/2011 | Zuili |
| 7,966,323 B2 | 6/2011 | Bocking et al. |
| 7,966,652 B2 | 6/2011 | Ganesan |
| 7,970,386 B2 | 6/2011 | Bhat et al. |
| 7,970,923 B2 | 6/2011 | Pedersen et al. |
| 8,001,278 B2 | 8/2011 | Huggahalli et al. |
| 8,012,219 B2 | 9/2011 | Mendez et al. |
| 8,037,421 B2 | 10/2011 | Scott et al. |
| 8,051,180 B2 | 11/2011 | Mazzaferri et al. |
| 8,060,074 B2 | 11/2011 | Danford et al. |
| 8,060,596 B1 | 11/2011 | Wootton et al. |
| 8,078,713 B1 | 12/2011 | Kim |
| 8,085,891 B2 | 12/2011 | Owen |
| 8,095,517 B2 | 1/2012 | Sandoval et al. |
| 8,095,786 B1 | 1/2012 | Kshirsagar et al. |
| 8,126,128 B1 | 2/2012 | Hicks, III et al. |
| 8,126,506 B2 | 2/2012 | Roundtree |
| 8,181,010 B1 | 5/2012 | Uchil et al. |
| 8,200,626 B1 | 6/2012 | Katzer et al. |
| 8,214,887 B2 | 7/2012 | Clark et al. |
| 8,238,256 B2 | 8/2012 | Nugent |
| 8,239,918 B1 | 8/2012 | Cohen |
| 8,245,285 B1 | 8/2012 | Ravishankar et al. |
| 8,272,030 B1 | 9/2012 | Annan et al. |
| 8,285,681 B2 | 10/2012 | Prahlad et al. |
| 8,296,239 B2 | 10/2012 | Nonaka |
| 8,296,821 B2 | 10/2012 | Nakae |
| 8,332,464 B2 | 12/2012 | Dispensa et al. |
| 8,359,016 B2 | 1/2013 | Lindeman et al. |
| 8,365,258 B2 | 1/2013 | Dispensa |
| 8,365,266 B2 | 1/2013 | Bogner |
| 8,402,011 B1 | 3/2013 | Bodenhamer |
| 8,406,748 B2 | 3/2013 | Raleigh et al. |
| 8,418,238 B2 | 4/2013 | Platt et al. |
| 8,463,253 B2 | 6/2013 | Chipalkatti et al. |
| 8,463,946 B2 | 6/2013 | Ferguson et al. |
| 8,468,090 B2 | 6/2013 | Lesandro et al. |
| 8,468,455 B2 | 6/2013 | Jorgensen et al. |
| 8,495,746 B2 | 7/2013 | Fissel et al. |
| 8,528,059 B1 | 9/2013 | Labana et al. |
| 8,549,656 B2 | 10/2013 | Blaisdell et al. |
| 8,560,709 B1 | 10/2013 | Shokhor et al. |
| 8,578,443 B2 | 11/2013 | Narain et al. |
| 8,584,114 B2 | 11/2013 | Rabinovich et al. |
| 8,601,562 B2 | 12/2013 | Milas |
| 8,613,070 B1 | 12/2013 | Borzycki et al. |
| 8,650,303 B1 | 2/2014 | Lang et al. |
| 8,650,620 B2 | 2/2014 | Chawla et al. |
| 8,660,530 B2 | 2/2014 | Sharp et al. |
| 8,719,898 B1 | 5/2014 | Barton et al. |
| 8,799,994 B2 | 8/2014 | Barton et al. |
| 8,806,570 B2 | 8/2014 | Barton et al. |
| 8,843,734 B2 | 9/2014 | Lim |
| 8,850,010 B1 | 9/2014 | Qureshi |
| 8,850,049 B1 | 9/2014 | Qureshi |
| 8,856,909 B1 * | 10/2014 | Chickering ............. 726/10 |
| 8,863,297 B2 | 10/2014 | Sharma et al. |
| 8,863,298 B2 | 10/2014 | Akella et al. |
| 8,863,299 B2 | 10/2014 | Sharma et al. |
| 8,881,228 B2 | 11/2014 | Qureshi |
| 8,918,834 B1 | 12/2014 | Samuelsson |
| 8,931,038 B2 | 1/2015 | Pulier et al. |
| 9,213,850 B2 | 12/2015 | Barton et al. |
| 2001/0042045 A1 | 11/2001 | Howard et al. |
| 2002/0112047 A1 | 8/2002 | Kushwaha et al. |
| 2003/0031319 A1 | 2/2003 | Abe et al. |
| 2003/0037103 A1 | 2/2003 | Salmi et al. |
| 2003/0046366 A1 | 3/2003 | Pardikar et al. |
| 2003/0065947 A1 | 4/2003 | Song et al. |
| 2003/0131245 A1 | 7/2003 | Linderman |
| 2003/0157947 A1 | 8/2003 | Fiatal et al. |
| 2003/0188193 A1 | 10/2003 | Venkataramappa |
| 2003/0229623 A1 | 12/2003 | Chang et al. |
| 2004/0006706 A1 | 1/2004 | Erlingsson |
| 2004/0010579 A1 | 1/2004 | Freese |
| 2004/0083273 A1 | 4/2004 | Madison et al. |
| 2004/0111640 A1 | 6/2004 | Baum |
| 2004/0117651 A1 | 6/2004 | Little et al. |
| 2004/0123153 A1 | 6/2004 | Wright et al. |
| 2004/0205233 A1 * | 10/2004 | Dunk ............. 709/238 |
| 2004/0230807 A1 | 11/2004 | Baird et al. |
| 2005/0027843 A1 | 2/2005 | Bozak et al. |
| 2005/0055578 A1 | 3/2005 | Wright et al. |
| 2005/0076082 A1 | 4/2005 | Le Pennec et al. |
| 2005/0076085 A1 | 4/2005 | Budd et al. |
| 2005/0097608 A1 | 5/2005 | Penke et al. |
| 2005/0149340 A1 | 7/2005 | Murakami et al. |
| 2005/0172241 A1 | 8/2005 | Daniels et al. |
| 2005/0193222 A1 | 9/2005 | Greene |
| 2005/0255838 A1 | 11/2005 | Adams et al. |
| 2005/0262429 A1 | 11/2005 | Elder et al. |
| 2005/0265548 A1 | 12/2005 | Tsuchimura |
| 2005/0273592 A1 | 12/2005 | Pryor et al. |
| 2006/0005250 A1 | 1/2006 | Chu et al. |
| 2006/0070114 A1 | 3/2006 | Wood et al. |
| 2006/0075123 A1 | 4/2006 | Burr et al. |
| 2006/0085826 A1 | 4/2006 | Funk et al. |
| 2006/0094400 A1 | 5/2006 | Beachem et al. |
| 2006/0112428 A1 | 5/2006 | Etelapera |
| 2006/0117104 A1 | 6/2006 | Taniguchi et al. |
| 2006/0120526 A1 | 6/2006 | Boucher et al. |
| 2006/0141985 A1 | 6/2006 | Patel et al. |
| 2006/0147043 A1 | 7/2006 | Mann et al. |
| 2006/0161635 A1 | 7/2006 | Lamkin et al. |
| 2006/0185004 A1 | 8/2006 | Song et al. |
| 2006/0224742 A1 | 10/2006 | Shahbazi |
| 2006/0225142 A1 | 10/2006 | Moon |
| 2006/0242685 A1 | 10/2006 | Heard et al. |

(56) References Cited

U.S. PATENT DOCUMENTS

| | | |
|---|---|---|
| 2006/0248577 A1 | 11/2006 | Beghian et al. |
| 2006/0259755 A1 | 11/2006 | Kenoyer |
| 2006/0282889 A1 | 12/2006 | Brown et al. |
| 2007/0005713 A1 | 1/2007 | LeVasseur et al. |
| 2007/0006327 A1 | 1/2007 | Lal et al. |
| 2007/0011749 A1 | 1/2007 | Allison et al. |
| 2007/0016771 A1 | 1/2007 | Allison et al. |
| 2007/0038764 A1 | 2/2007 | Maillard |
| 2007/0049297 A1 | 3/2007 | Gopalan et al. |
| 2007/0054627 A1 | 3/2007 | Wormald |
| 2007/0056043 A1 | 3/2007 | Onyon et al. |
| 2007/0072598 A1 | 3/2007 | Coleman et al. |
| 2007/0074033 A1 | 3/2007 | Adams et al. |
| 2007/0109983 A1 | 5/2007 | Shankar et al. |
| 2007/0110317 A1 | 5/2007 | Davis et al. |
| 2007/0118558 A1 | 5/2007 | Kahandaliyanage |
| 2007/0156897 A1 | 7/2007 | Lim |
| 2007/0180447 A1 | 8/2007 | Mazzaferri et al. |
| 2007/0186106 A1* | 8/2007 | Ting et al. ............ 713/168 |
| 2007/0198656 A1 | 8/2007 | Mazzaferri et al. |
| 2007/0199051 A1 | 8/2007 | Parikh et al. |
| 2007/0204153 A1 | 8/2007 | Tome et al. |
| 2007/0204166 A1 | 8/2007 | Tome et al. |
| 2007/0208936 A1 | 9/2007 | Ramos Robles |
| 2007/0214272 A1 | 9/2007 | Isaacson |
| 2007/0226034 A1 | 9/2007 | Khan |
| 2007/0226225 A1 | 9/2007 | Yiu et al. |
| 2007/0226227 A1 | 9/2007 | Helfman |
| 2007/0226773 A1 | 9/2007 | Pouliot |
| 2007/0244987 A1 | 10/2007 | Pedersen et al. |
| 2007/0245409 A1 | 10/2007 | Harris et al. |
| 2007/0248085 A1 | 10/2007 | Volpano |
| 2007/0266422 A1 | 11/2007 | Germano et al. |
| 2007/0283324 A1 | 12/2007 | Geisinger |
| 2008/0027982 A1 | 1/2008 | Subramanian et al. |
| 2008/0046580 A1 | 2/2008 | Lafuente et al. |
| 2008/0047006 A1 | 2/2008 | Jeong et al. |
| 2008/0047015 A1 | 2/2008 | Cornwall et al. |
| 2008/0052395 A1 | 2/2008 | Wright et al. |
| 2008/0066020 A1 | 3/2008 | Boss et al. |
| 2008/0066177 A1 | 3/2008 | Bender |
| 2008/0070495 A1 | 3/2008 | Stricklen et al. |
| 2008/0092215 A1 | 4/2008 | Soukup et al. |
| 2008/0127292 A1 | 5/2008 | Cooper et al. |
| 2008/0133729 A1 | 6/2008 | Fridman et al. |
| 2008/0134292 A1 | 6/2008 | Ariel et al. |
| 2008/0141335 A1 | 6/2008 | Thomas |
| 2008/0163188 A1 | 7/2008 | Siskind et al. |
| 2008/0163286 A1 | 7/2008 | Rudolph et al. |
| 2008/0194296 A1 | 8/2008 | Roundtree |
| 2008/0196038 A1 | 8/2008 | Antonio et al. |
| 2008/0196082 A1 | 8/2008 | Sandoval et al. |
| 2008/0209506 A1 | 8/2008 | Ghai et al. |
| 2008/0214300 A1 | 9/2008 | Williams et al. |
| 2008/0229117 A1 | 9/2008 | Shin et al. |
| 2008/0235760 A1 | 9/2008 | Broussard et al. |
| 2008/0263224 A1 | 10/2008 | Gilhuly et al. |
| 2008/0270240 A1 | 10/2008 | Chu |
| 2008/0304665 A1 | 12/2008 | Ma et al. |
| 2008/0313648 A1 | 12/2008 | Wang et al. |
| 2008/0317292 A1 | 12/2008 | Baker et al. |
| 2008/0318616 A1 | 12/2008 | Chipalkatti et al. |
| 2009/0006232 A1 | 1/2009 | Gallagher et al. |
| 2009/0028049 A1 | 1/2009 | Boudreau et al. |
| 2009/0030968 A1 | 1/2009 | Boudreau et al. |
| 2009/0037686 A1 | 2/2009 | Mendonca |
| 2009/0037976 A1 | 2/2009 | Teo et al. |
| 2009/0049425 A1 | 2/2009 | Liepert et al. |
| 2009/0064292 A1 | 3/2009 | Carter et al. |
| 2009/0075630 A1 | 3/2009 | McLean |
| 2009/0077638 A1 | 3/2009 | Norman et al. |
| 2009/0083374 A1 | 3/2009 | Saint Clair |
| 2009/0119773 A1 | 5/2009 | D'Amore et al. |
| 2009/0121890 A1 | 5/2009 | Brown et al. |
| 2009/0170532 A1 | 7/2009 | Lee et al. |
| 2009/0172789 A1 | 7/2009 | Band et al. |
| 2009/0178111 A1 | 7/2009 | Moriconi et al. |
| 2009/0199178 A1 | 8/2009 | Keller et al. |
| 2009/0199277 A1 | 8/2009 | Norman et al. |
| 2009/0210934 A1 | 8/2009 | Innes |
| 2009/0221278 A1 | 9/2009 | Spelta et al. |
| 2009/0222880 A1 | 9/2009 | Mayer et al. |
| 2009/0228714 A1 | 9/2009 | Fiske et al. |
| 2009/0228954 A1 | 9/2009 | Hu et al. |
| 2009/0228963 A1 | 9/2009 | Pearce et al. |
| 2009/0249359 A1 | 10/2009 | Caunter et al. |
| 2009/0253410 A1 | 10/2009 | Fitzgerald et al. |
| 2009/0253412 A1 | 10/2009 | Sigmund et al. |
| 2009/0265554 A1 | 10/2009 | Robles et al. |
| 2009/0282127 A1 | 11/2009 | Leblanc et al. |
| 2009/0282473 A1 | 11/2009 | Karlson et al. |
| 2009/0323916 A1 | 12/2009 | O'Sullivan et al. |
| 2009/0325615 A1 | 12/2009 | McKay et al. |
| 2010/0054463 A1 | 3/2010 | Tsan |
| 2010/0064341 A1 | 3/2010 | Aldera |
| 2010/0077469 A1 | 3/2010 | Furman et al. |
| 2010/0100825 A1 | 4/2010 | Sharoni |
| 2010/0100925 A1 | 4/2010 | Hinton |
| 2010/0124196 A1 | 5/2010 | Bonar et al. |
| 2010/0146523 A1 | 6/2010 | Brigaut et al. |
| 2010/0146582 A1 | 6/2010 | Jaber et al. |
| 2010/0150341 A1 | 6/2010 | Dodgson et al. |
| 2010/0154025 A1 | 6/2010 | Esteve Balducci et al. |
| 2010/0162232 A1 | 6/2010 | Bhatia et al. |
| 2010/0173607 A1 | 7/2010 | Thornton et al. |
| 2010/0180346 A1 | 7/2010 | Nicolson et al. |
| 2010/0192212 A1 | 7/2010 | Raleigh |
| 2010/0228825 A1 | 9/2010 | Hegde et al. |
| 2010/0228961 A1 | 9/2010 | Burns et al. |
| 2010/0229197 A1 | 9/2010 | Yi et al. |
| 2010/0248699 A1 | 9/2010 | Dumais |
| 2010/0257580 A1 | 10/2010 | Zhao |
| 2010/0279652 A1 | 11/2010 | Sharp et al. |
| 2010/0287619 A1 | 11/2010 | Chase |
| 2010/0299152 A1 | 11/2010 | Batchu et al. |
| 2010/0299376 A1 | 11/2010 | Batchu et al. |
| 2010/0317336 A1 | 12/2010 | Ferren et al. |
| 2010/0318992 A1 | 12/2010 | Kushwaha et al. |
| 2010/0319053 A1 | 12/2010 | Gharabally |
| 2010/0325097 A1 | 12/2010 | Er et al. |
| 2010/0333165 A1 | 12/2010 | Basak et al. |
| 2011/0030044 A1 | 2/2011 | Kranendonk et al. |
| 2011/0072492 A1 | 3/2011 | Mohler et al. |
| 2011/0145833 A1 | 6/2011 | De Los Reyes et al. |
| 2011/0154266 A1 | 6/2011 | Friend et al. |
| 2011/0154477 A1 | 6/2011 | Parla et al. |
| 2011/0154498 A1 | 6/2011 | Fissel et al. |
| 2011/0179484 A1 | 7/2011 | Tuvell et al. |
| 2011/0208797 A1 | 8/2011 | Kim |
| 2011/0208838 A1 | 8/2011 | Thomas et al. |
| 2011/0209064 A1 | 8/2011 | Jorgensen et al. |
| 2011/0209194 A1 | 8/2011 | Kennedy |
| 2011/0219124 A1 | 9/2011 | Allen et al. |
| 2011/0225417 A1 | 9/2011 | Maharajh et al. |
| 2011/0239125 A1 | 9/2011 | Kristensen et al. |
| 2011/0252232 A1 | 10/2011 | De Atley et al. |
| 2011/0252459 A1 | 10/2011 | Walsh et al. |
| 2011/0258301 A1 | 10/2011 | McCormick et al. |
| 2011/0270963 A1 | 11/2011 | Saito et al. |
| 2011/0271279 A1 | 11/2011 | Pate |
| 2011/0276683 A1 | 11/2011 | Goldschlag et al. |
| 2011/0276699 A1 | 11/2011 | Pedersen |
| 2011/0277027 A1 | 11/2011 | Hayton et al. |
| 2011/0283347 A1 | 11/2011 | Bhuta et al. |
| 2011/0295970 A1 | 12/2011 | Miyazawa |
| 2011/0314534 A1 | 12/2011 | James |
| 2012/0002813 A1 | 1/2012 | Wei et al. |
| 2012/0005476 A1 | 1/2012 | Wei et al. |
| 2012/0005724 A1 | 1/2012 | Lee |
| 2012/0005745 A1 | 1/2012 | Wei et al. |
| 2012/0005746 A1 | 1/2012 | Wei et al. |
| 2012/0023378 A1 | 1/2012 | Nomura et al. |
| 2012/0023506 A1 | 1/2012 | Maeckel et al. |
| 2012/0036347 A1 | 2/2012 | Swanson et al. |

(56) References Cited

U.S. PATENT DOCUMENTS

| | | |
|---|---|---|
| 2012/0036370 A1 | 2/2012 | Lim et al. |
| 2012/0042036 A1 | 2/2012 | Lau et al. |
| 2012/0052954 A1 | 3/2012 | Zhu et al. |
| 2012/0054853 A1 | 3/2012 | Gupta et al. |
| 2012/0066691 A1 | 3/2012 | Branton |
| 2012/0079475 A1 | 3/2012 | Hicks, III et al. |
| 2012/0079556 A1 | 3/2012 | Wahl |
| 2012/0084184 A1 | 4/2012 | Raleigh et al. |
| 2012/0088540 A1 | 4/2012 | Smith et al. |
| 2012/0096533 A1 | 4/2012 | Boulos et al. |
| 2012/0096544 A1 | 4/2012 | Hosoda |
| 2012/0102195 A1 | 4/2012 | Adams et al. |
| 2012/0109384 A1 | 5/2012 | Stepanian |
| 2012/0117622 A1 | 5/2012 | Gronholm et al. |
| 2012/0129503 A1 | 5/2012 | Lindeman et al. |
| 2012/0131116 A1 | 5/2012 | Tu et al. |
| 2012/0131343 A1 | 5/2012 | Choi et al. |
| 2012/0131685 A1 | 5/2012 | Broch et al. |
| 2012/0151033 A1 | 6/2012 | Baliga et al. |
| 2012/0154265 A1 | 6/2012 | Kim et al. |
| 2012/0154413 A1 | 6/2012 | Kim et al. |
| 2012/0157165 A1 | 6/2012 | Kim et al. |
| 2012/0157166 A1 | 6/2012 | Kim et al. |
| 2012/0159139 A1 | 6/2012 | Kim et al. |
| 2012/0165075 A1 | 6/2012 | Kim et al. |
| 2012/0166516 A1 | 6/2012 | Simmons et al. |
| 2012/0166524 A1 | 6/2012 | Watakabe et al. |
| 2012/0166997 A1 | 6/2012 | Cho et al. |
| 2012/0167118 A1 | 6/2012 | Pingili et al. |
| 2012/0167159 A1 | 6/2012 | Mefford, Jr. et al. |
| 2012/0174237 A1 | 7/2012 | Krzyzanowski |
| 2012/0179802 A1* | 7/2012 | Narasimhan et al. ........ 709/223 |
| 2012/0179909 A1 | 7/2012 | Sagi et al. |
| 2012/0185910 A1 | 7/2012 | Miettinen et al. |
| 2012/0185913 A1 | 7/2012 | Martinez et al. |
| 2012/0191716 A1 | 7/2012 | Omoigui |
| 2012/0198570 A1 | 8/2012 | Joa et al. |
| 2012/0204220 A1 | 8/2012 | Lavi |
| 2012/0210443 A1 | 8/2012 | Blaisdell et al. |
| 2012/0214472 A1 | 8/2012 | Tadayon et al. |
| 2012/0222120 A1 | 8/2012 | Rim et al. |
| 2012/0233130 A1 | 9/2012 | Vedachalam et al. |
| 2012/0238206 A1 | 9/2012 | Singh et al. |
| 2012/0238257 A1 | 9/2012 | Anson |
| 2012/0240183 A1 | 9/2012 | Sinha |
| 2012/0254768 A1 | 10/2012 | Aggarwal et al. |
| 2012/0255026 A1 | 10/2012 | Baca et al. |
| 2012/0265792 A1 | 10/2012 | Salters |
| 2012/0270522 A1 | 10/2012 | Laudermilch et al. |
| 2012/0272221 A1 | 10/2012 | Pessoa et al. |
| 2012/0278454 A1 | 11/2012 | Stewart et al. |
| 2012/0284325 A1 | 11/2012 | Erb |
| 2012/0284779 A1 | 11/2012 | Ingrassia, Jr. et al. |
| 2012/0290694 A9 | 11/2012 | Marl et al. |
| 2012/0291114 A1 | 11/2012 | Poliashenko et al. |
| 2012/0303476 A1 | 11/2012 | Krzyzanowski et al. |
| 2012/0303778 A1 | 11/2012 | Ahiska et al. |
| 2012/0304310 A1 | 11/2012 | Blaisdell |
| 2012/0311154 A1 | 12/2012 | Morgan |
| 2012/0311659 A1 | 12/2012 | Narain et al. |
| 2012/0317185 A1 | 12/2012 | Shah et al. |
| 2012/0321087 A1 | 12/2012 | Fleischman et al. |
| 2012/0324568 A1 | 12/2012 | Wyatt et al. |
| 2012/0331088 A1 | 12/2012 | O'Hare et al. |
| 2012/0331527 A1 | 12/2012 | Walters et al. |
| 2012/0331528 A1 | 12/2012 | Fu et al. |
| 2013/0002725 A1 | 1/2013 | Kim et al. |
| 2013/0007245 A1 | 1/2013 | Malik et al. |
| 2013/0007842 A1 | 1/2013 | Park et al. |
| 2013/0013653 A1 | 1/2013 | Thompson |
| 2013/0013688 A1 | 1/2013 | Wang et al. |
| 2013/0013932 A1 | 1/2013 | Kong et al. |
| 2013/0014239 A1 | 1/2013 | Pieczul et al. |
| 2013/0014267 A1 | 1/2013 | Farrugia et al. |
| 2013/0019018 A1 | 1/2013 | Rice |
| 2013/0019282 A1 | 1/2013 | Rice et al. |
| 2013/0024424 A1 | 1/2013 | Prahlad et al. |
| 2013/0024928 A1 | 1/2013 | Burke et al. |
| 2013/0035063 A1* | 2/2013 | Fisk et al. ............... 455/410 |
| 2013/0042294 A1 | 2/2013 | Colvin et al. |
| 2013/0054922 A1 | 2/2013 | Tuch et al. |
| 2013/0054962 A1 | 2/2013 | Chawla et al. |
| 2013/0055378 A1 | 2/2013 | Chang et al. |
| 2013/0059284 A1 | 3/2013 | Giedgowd, Jr. et al. |
| 2013/0066960 A1 | 3/2013 | Fieremans et al. |
| 2013/0066978 A1 | 3/2013 | Bentley et al. |
| 2013/0067229 A1 | 3/2013 | German et al. |
| 2013/0074142 A1 | 3/2013 | Brennan et al. |
| 2013/0078949 A1 | 3/2013 | Pecen et al. |
| 2013/0084847 A1 | 4/2013 | Tibbitts et al. |
| 2013/0086684 A1 | 4/2013 | Mohler |
| 2013/0091543 A1 | 4/2013 | Wade et al. |
| 2013/0097421 A1 | 4/2013 | Lim |
| 2013/0097660 A1 | 4/2013 | Das et al. |
| 2013/0111540 A1 | 5/2013 | Sabin |
| 2013/0117240 A1 | 5/2013 | Taylor et al. |
| 2013/0117563 A1 | 5/2013 | Grabelkovsky |
| 2013/0117805 A1 | 5/2013 | Kent et al. |
| 2013/0117840 A1 | 5/2013 | Roesner et al. |
| 2013/0124673 A1 | 5/2013 | Hjelm et al. |
| 2013/0130651 A1 | 5/2013 | Deasy et al. |
| 2013/0130652 A1 | 5/2013 | Deasy et al. |
| 2013/0130653 A1 | 5/2013 | Deasy et al. |
| 2013/0132457 A1 | 5/2013 | Diwakar |
| 2013/0132941 A1 | 5/2013 | Lindeman et al. |
| 2013/0133061 A1 | 5/2013 | Fainkichen et al. |
| 2013/0138766 A1 | 5/2013 | Draluk et al. |
| 2013/0138810 A1 | 5/2013 | Binyamin et al. |
| 2013/0139241 A1 | 5/2013 | Leeder |
| 2013/0142043 A1 | 6/2013 | Tapia et al. |
| 2013/0145448 A1 | 6/2013 | Newell |
| 2013/0151598 A1 | 6/2013 | Fu et al. |
| 2013/0167247 A1 | 6/2013 | Brown et al. |
| 2013/0171967 A1 | 7/2013 | Ashour et al. |
| 2013/0212212 A1 | 8/2013 | Addepalli et al. |
| 2013/0219176 A1 | 8/2013 | Akella et al. |
| 2013/0219211 A1 | 8/2013 | Gopinath et al. |
| 2013/0219456 A1* | 8/2013 | Sharma et al. ................... 726/1 |
| 2013/0227636 A1 | 8/2013 | Bettini et al. |
| 2013/0227659 A1 | 8/2013 | Raleigh |
| 2013/0232541 A1 | 9/2013 | Kapadia et al. |
| 2013/0239192 A1* | 9/2013 | Linga ..................... G06F 21/44 726/7 |
| 2013/0254262 A1 | 9/2013 | Udall |
| 2013/0254660 A1 | 9/2013 | Fujioka |
| 2013/0254831 A1 | 9/2013 | Roach et al. |
| 2013/0263208 A1 | 10/2013 | Challa |
| 2013/0263209 A1 | 10/2013 | Panuganty |
| 2013/0268676 A1 | 10/2013 | Martins et al. |
| 2013/0283335 A1 | 10/2013 | Lakshminarayanan et al. |
| 2013/0288656 A1 | 10/2013 | Schultz et al. |
| 2013/0290709 A1 | 10/2013 | Muppidi et al. |
| 2013/0291052 A1 | 10/2013 | Hadar et al. |
| 2013/0297604 A1 | 11/2013 | Sutedja et al. |
| 2013/0297662 A1 | 11/2013 | Sharma et al. |
| 2013/0298185 A1 | 11/2013 | Koneru et al. |
| 2013/0298201 A1 | 11/2013 | Aravindakshan et al. |
| 2013/0298242 A1 | 11/2013 | Kumar et al. |
| 2013/0303194 A1 | 11/2013 | Rowles |
| 2013/0311593 A1 | 11/2013 | Prince et al. |
| 2013/0311597 A1 | 11/2013 | Arrouye et al. |
| 2013/0318345 A1* | 11/2013 | Hengeveld ............... 713/168 |
| 2013/0333005 A1 | 12/2013 | Kim et al. |
| 2013/0346268 A1 | 12/2013 | Pereira et al. |
| 2013/0347130 A1 | 12/2013 | Sima |
| 2014/0006347 A1 | 1/2014 | Qureshi et al. |
| 2014/0006512 A1 | 1/2014 | Huang et al. |
| 2014/0007183 A1 | 1/2014 | Qureshi et al. |
| 2014/0007214 A1* | 1/2014 | Qureshi et al. ................ 726/12 |
| 2014/0007215 A1 | 1/2014 | Romano et al. |
| 2014/0007222 A1 | 1/2014 | Qureshi et al. |
| 2014/0020062 A1 | 1/2014 | Tumula et al. |
| 2014/0020073 A1 | 1/2014 | Ronda et al. |
| 2014/0032691 A1 | 1/2014 | Barton et al. |

(56) References Cited

U.S. PATENT DOCUMENTS

| | | |
|---|---|---|
| 2014/0032733 A1 | 1/2014 | Barton et al. |
| 2014/0032758 A1 | 1/2014 | Barton et al. |
| 2014/0032759 A1 | 1/2014 | Barton et al. |
| 2014/0033271 A1 | 1/2014 | Barton et al. |
| 2014/0040638 A1 | 2/2014 | Barton et al. |
| 2014/0040656 A1 | 2/2014 | Ho et al. |
| 2014/0040977 A1 | 2/2014 | Barton et al. |
| 2014/0040978 A1 | 2/2014 | Barton et al. |
| 2014/0040979 A1 | 2/2014 | Barton et al. |
| 2014/0047535 A1 | 2/2014 | Parla et al. |
| 2014/0059640 A9 | 2/2014 | Raleigh et al. |
| 2014/0059642 A1 | 2/2014 | Deasy et al. |
| 2014/0096199 A1 | 4/2014 | Dave et al. |
| 2014/0108649 A1 | 4/2014 | Barton et al. |
| 2014/0130174 A1 | 5/2014 | Celi, Jr. et al. |
| 2014/0162614 A1 | 6/2014 | Lindeman et al. |
| 2014/0173700 A1 | 6/2014 | Awan et al. |
| 2014/0181934 A1 | 6/2014 | Mayblum et al. |
| 2014/0189808 A1 | 7/2014 | Mahaffey et al. |
| 2014/0298401 A1 | 10/2014 | Batson et al. |
| 2014/0315536 A1 | 10/2014 | Chow et al. |
| 2015/0026827 A1 | 1/2015 | Kao et al. |
| 2015/0087270 A1 | 3/2015 | Richardson et al. |

FOREIGN PATENT DOCUMENTS

| | | |
|---|---|---|
| EP | 2428894 A1 | 3/2012 |
| EP | 2523107 A1 | 11/2012 |
| GB | 2411320 A | 8/2005 |
| GB | 2462442 A | 2/2010 |
| WO | 9914652 A1 | 3/1999 |
| WO | 02084460 A2 | 10/2002 |
| WO | 2004107646 A1 | 12/2004 |
| WO | 2007113709 A1 | 10/2007 |
| WO | 2008086611 A1 | 7/2008 |
| WO | 2009021200 A1 | 2/2009 |
| WO | 2010054258 A1 | 5/2010 |
| WO | 2010115289 A1 | 10/2010 |

OTHER PUBLICATIONS

A. F. G. Skarmeta and G. M. Perez, "Policy-based dynamic provision of IP services in a secure VPN coalition scenario," in IEEE Communications Magazine, vol. 42, No. 11, pp. 118-124, Nov. 2004.*

Non-Final Office Action dated Dec. 19, 2013, in U.S. Appl. No. 14/032,706.

Non-Final Office Action dated Dec. 19, 2013, in U.S. Appl. No. 14/032,885.

Non-final Office Action dated Jan. 9, 2014, in U.S. Appl. No. 14/032,756.

Non-final Office Action dated Jan. 10, 2014, in U.S. Appl. No. 14/032,820.

Wright et al., "Your Firm's Mobile Devices: How Secure are They?". Journal of Corporate Accounting and Finance. Jul. 1, 2011. Willey Periodicals. pp. 13-21.

Lowe, "Application-Specific VPNs," Dec. 13, 2005.

International Search Report and Written Opinion mailed Nov. 26, 2013 in Internation Application No. PCT/US2013/060388.

Xuetao Wei, et al., "Malicious Android Applications in the Enterprise: What Do They Do and How Do We Fix It?,"• ICDE Workshop on Secure Data Management on Smartphones and Mobiles, Apr. 2012, 4 pages.

Ranjan et al., "Programming Cloud Resource Orchestration Framework: Operations and Research Challenges", arvix.org, 2012, pp. 1-19.

Na et al., "Personal Cloud Computing Security Framework," 2010 IEEE Asia-Pacific Computing Conference, 2010, pp. 671-675.

Wilson et al., "Unified Security Framework", In proceedings of the 1st International Symposium on Information and Communication Technologies, pp. 500-505. Trinity College Dublin, 2003.

Mysore et al., "The Liquid Media System—a Multi-Device Streaming Media Orchestration Framework", Ubicomp 2003 Workshop, pp. 1-4.

Written Opinion and International Search Report, PCT/US2013/062636, Jan. 10, 2014.

International Search Report and Written Opinion dated Feb. 4, 2014 in Application No. PCT/US2013/064349.

International Search Report and Written Opinion mailed Jan. 21, 2014 in International Application No. PCT/US2013/063856.

Apple Inc., iPad User Guide for iOS 6.1 Software, Jan. 2013, Chapter 26, Accessibility, pp. 107-108.

"Citrix XenMobile Technology Overview: White Paper," Citrix White Papers online, Jul. 31, 2012, pp. 1-14; retrieved from http://insight.com/content/aam/insight/en_US/pdfs/citrix/xenmobile-tech-overview.pdf, retrieved Jan. 27, 2014.

Laverty, Joseph Packy, et al., Comparative Analysis of Mobile Application Development and Security Models, [Online] 2011, Issues in Information Systems vol. XII, No. 1, [Retrieved from the Internet] <http://iacis.org/iis/2011/301-312_AL2011_1694.pdf> pp. 301-312.

Potharaju, Rahul, et al., Plagiarizing smartphone applications: attack strategies and defense techniques, [Online] 2012, Engineering Secure Software and Systems, Springer Berlin Heidelberg, [Retrieved from the Internet] <http://link.springer.com/chapter/10.1007/978-3-642-28166-2_11#> pp. 106-120.

Peine, H., Security concepts and implementation in the Ara mobile agent system, [Online] 1998, Enabling Technologies: Infrastructure for Collaborative Enterprises, 1998 Seventh IEEE International Workshops on Jun. 17-19, 1998, [Retrieved from the Internet] <http://ieeexplore.ieee.org/stamp/stamp.jsp?tp=& arnumber=725699&isnumber=15665> pp. 236-242.

Shah et al., Securing Java-Based Mobile Agents through Byte Code Obfuscation Techniques, [Online] Dec. 23-24, 2006, Multitopic Conference, 2006, INMIC '06. IEEE, [Retrieved from the Internet] <http://ieeexplore.ieee.org/stamp/stamp.jsp?tp=& arnumber=4196425&isnumber=414013> pp. 305-308.

No stated author; Administration Guide for Symantec Endpoint Protection and Symantec Network Access Control; 2008; Retrieved from the Internet <URL:ftp.symantec.com/public/english_us_canada/products/symantec_endpoint_protection/11.0/manals/administration_guide.pdf>; pp. 1-615 as printed.

No stated author; Symantec Network Access Control Enforcer Implementation Guide; 2007; Retrieved from the Internet <URL:ftp.symantec.com/public/english_us_canada/products/symantec_network_access_control/11.0/manuals/enforcer_implementation_guide.pdf>; pp. 1-132 as printed.

Andreas, Digging into the Exchange ActiveSync Protocol, Mobility Dojo.net, Oct. 25, 2010, http://mobilitydojo.net/2010/03/17/digging-into-the-exchange-activesync-protocol/.

Nov. 5, 2015—(EP) Office Action—App 13773923.1.

* cited by examiner

PROVIDING MOBILE DEVICE MANAGEMENT FUNCTIONALITIES

CROSS-REFERENCE TO RELATED APPLICATIONS

This application is a continuation of U.S. patent application Ser. No. 14/025,898, filed Sep. 13, 2013, and entitled "PROVIDING MOBILE DEVICE MANAGEMENT FUNCTIONALITIES," and which is incorporated by reference herein in its entirety. In addition, this application claims the benefit of U.S. Provisional Patent Application Ser. No. 61/863,629, filed Aug. 8, 2013, and entitled "PROVIDING MOBILE DEVICE MANAGEMENT FUNCTIONALITIES," and which is incorporated by reference herein in its entirety. This application also claims the benefit of U.S. Provisional Patent Application Ser. No. 61/806,577, filed Mar. 29, 2013, and entitled "SYSTEMS AND METHODS FOR ENTERPRISE MOBILITY MANAGEMENT," and which is incorporated by reference herein in its entirety.

BACKGROUND

Aspects of the disclosure relate to computer hardware and software. In particular, one or more aspects of the disclosure generally relate to computer hardware and software for providing mobile device management functionalities.

Increasingly, corporations and other organizations are providing and/or otherwise enabling their employees and other associates with mobile devices, such as smart phones, tablet computers, and other mobile computing devices. As these devices continue to grow in popularity and provide an increasing number of functions, many organizations may wish to place certain controls on how these devices can be used, what resources these devices can access, and how the applications running on these devices can interact with other resources.

SUMMARY

Various aspects of the disclosure provide more efficient, effective, functional, and convenient ways of controlling how mobile devices can be used, what resources mobile devices can access, and how the applications and other software running on these devices can interact with other resources. In particular, in one or more embodiments discussed in greater detail below, mobile device management functionalities are deployed, implemented, and/or used in a number of different ways to provide one or more of these and/or other advantages.

In some embodiments, a computing device may load a managed browser. Subsequently, the computing device may apply one or more mobile device management policies to the managed browser, and at least one policy of the one or more mobile device management policies may be configured to control one or more functionalities of the computing device.

In some embodiments, a mobile device management agent may monitor state information associated with a mobile computing device. Subsequently, the mobile device management agent may apply one or more policies to application tunneling functionalities on the mobile computing device based on the monitored state information.

In some embodiments, a computing device may establish a connection to at least one other device to initiate a device cloud. Subsequently, the computing device may apply one or more policies to the device cloud, and the one or more policies may be configured to allocate a first role the computing device and a second role to the at least one other device participating in the device cloud.

In some embodiments, a mobile device management agent may monitor state information associated with a mobile computing device. Subsequently, one or more modes of a multi-mode application may be selectively disabled based on the monitored state information.

In some embodiments, a mobile device management agent may monitor state information associated with a mobile computing device. Subsequently, one or more policies may be enforced on at least one application on the mobile computing device based on the monitored state information.

In some embodiments, a mobile device management agent may monitor state information associated with a mobile computing device. Subsequently, a secure document container may be controlled based on the monitored state information.

In some embodiments, a mobile device management agent may monitor state information associated with a mobile computing device. Subsequently, a mobile device management policy enforcement scheme on the mobile computing device may be dynamically modified based on the monitored state information.

In some embodiments, a mobile computing device may receive at least one mobile device management policy from an application store. Subsequently, state information associated with the mobile computing device may be monitored via a mobile device management agent. Then, the at least one mobile device management policy may be enforced based on the monitored state information.

In some embodiments, a mobile computing device may receive a single sign-on (SSO) credential that is associated with at least one user account. Subsequently, state information associated with the mobile computing device may be monitored via a mobile device management agent. Then, at least one mobile device management policy may be enforced based on the monitored state information and the SSO credential.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings identified above, which form a part hereof, and in which is shown by way of illustration various embodiments in which various aspects of the disclosure may be practiced. Other embodiments may be utilized, and structural and functional modifications may be made, without departing from the scope discussed herein. Various aspects are capable of other embodiments and of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As noted above, certain embodiments are discussed herein that relate to providing mobile device management functionalities. Before discussing these concepts in greater detail, however, several examples of computing architecture and enterprise mobility management architecture that may be used in implementing and/or otherwise providing various aspects of the disclosure will first be discussed with respect to FIGS. 1-4.

Computing Architecture

Figure 1:
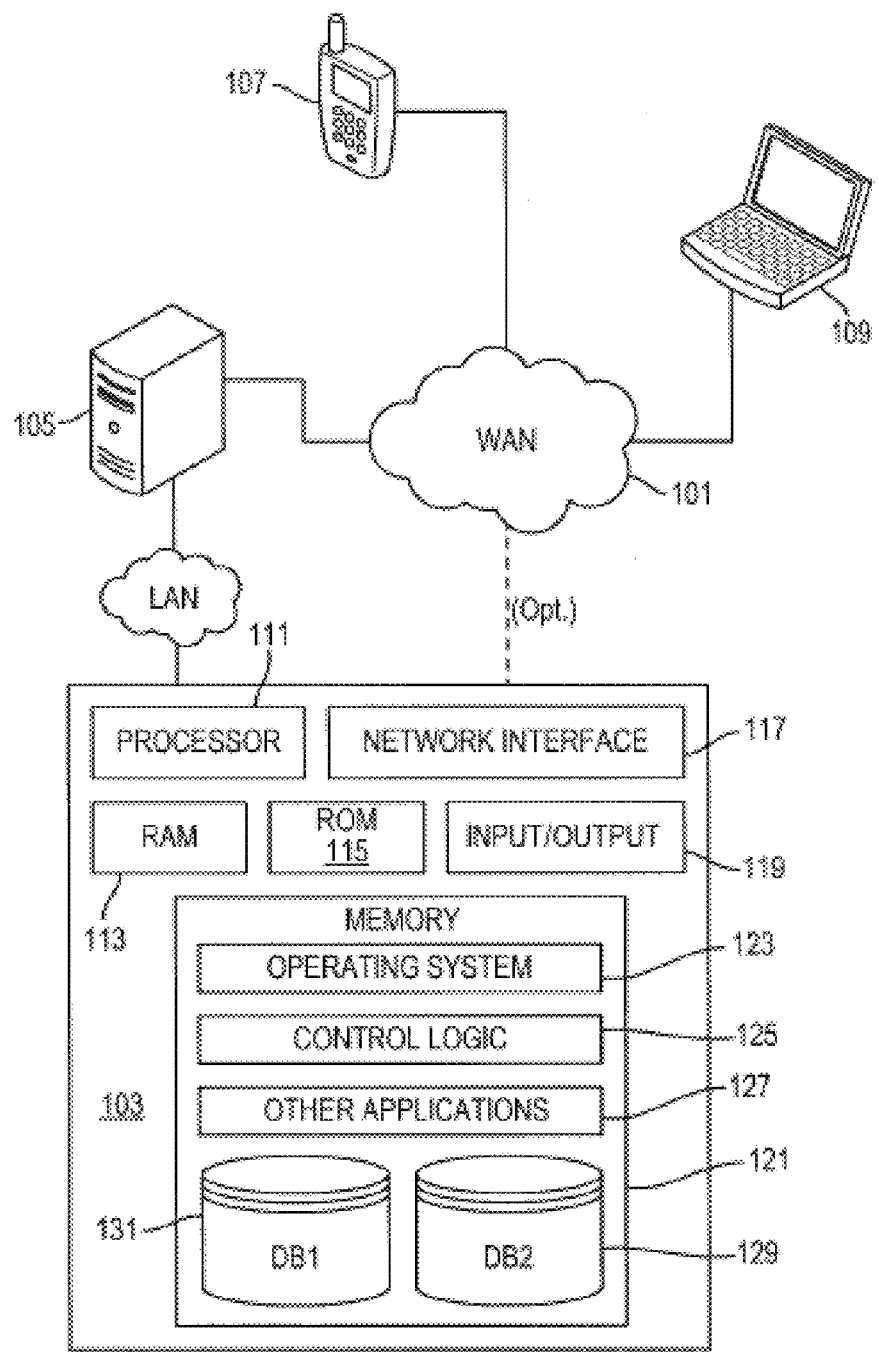
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LANs), metropolitan area networks (MAN), wireless networks, personal networks (PAN), and the like. Network 101 is for illustration purposes and may be replaced with fewer or additional computer networks. A LAN may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Javascript or ActionScript. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
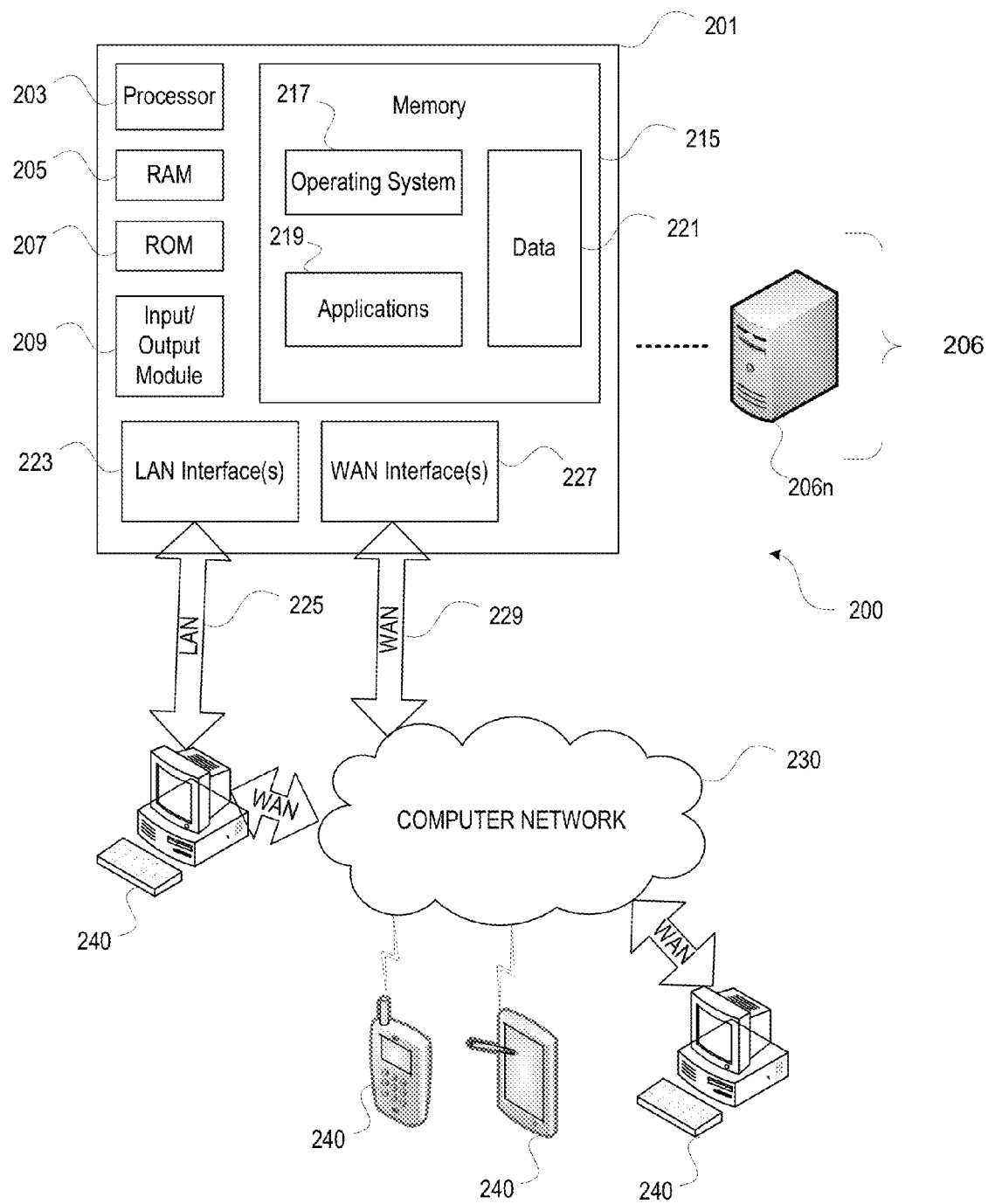
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including random access memory (RAM) 205, read-only memory (ROM) 207, input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, PDAs, notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network PCs, mini-computers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine client agent program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a SSL VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b, and responds to the request generated by the client machine 240 with a response from the second server 206b. First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Enterprise Mobility Management Architecture

Figure 3:
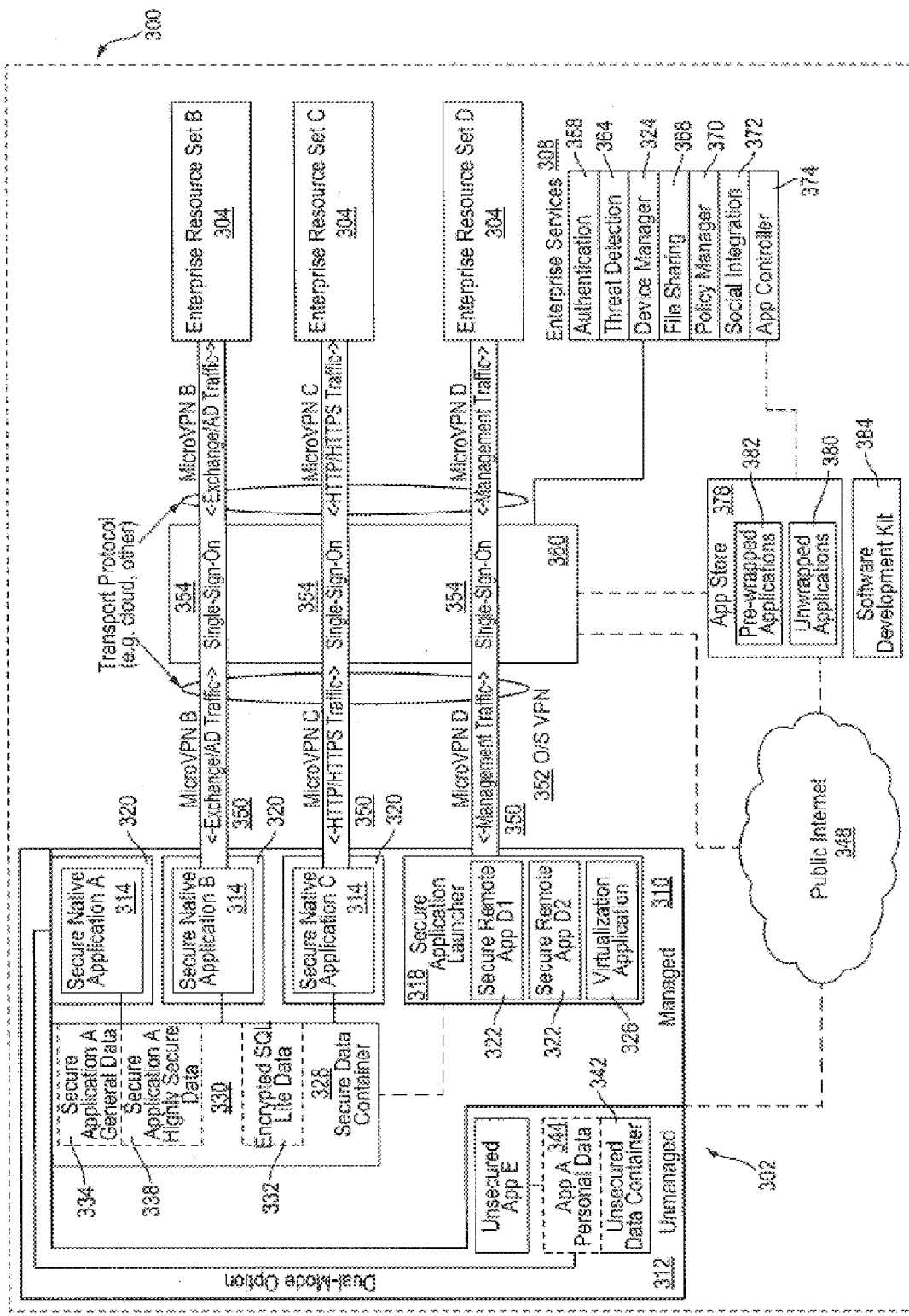
FIG. 3 depicts an illustrative enterprise mobility management system that may be used in accordance with one or more illustrative aspects described herein.

FIG. 3 represents an enterprise mobility technical architecture 300 for use in an enterprise environment, a BYOD environment, or other mobile environments. The architecture enables a user of a mobile device 302 (e.g., as client 107, 211, or otherwise) to both access enterprise or personal resources from a mobile device 302 and use the mobile device 302 for personal use. The user may access such enterprise resources 304 or enterprise services 308 using a mobile device 302 that is purchased by the user or a mobile device 302 that is provided by the enterprise to the user. The user may utilize the mobile device 302 for business use only or for business and personal use. The mobile device may run an iOS operating system, Android operating system, and/or the like. The enterprise may choose to implement policies to manage the mobile device 304. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 304 that is managed through the application of mobile device management policies may be referred to as an enrolled device.

The operating system of the mobile device may be separated into a managed partition 310 and an unmanaged partition 312. The managed partition 310 may have policies applied to it to secure the applications running on and data stored in the managed partition. The applications running on the managed partition may be secure applications. The secure applications may be email applications, web browsing applications, software-as-a-service (SaaS) access applications, Windows Application access applications, and the like. The secure applications may be secure native applications 314, secure remote applications 322 executed by a secure application launcher 318, virtualization applications 326 executed by a secure application launcher 318, and the like. The secure native applications 314 may be wrapped by a secure application wrapper 320. The secure application wrapper 320 may include integrated policies that are executed on the mobile device 302 when the secure native application is executed on the device. The secure application wrapper 320 may include meta-data that points the secure native application 314 running on the mobile device 302 to the resources hosted at the enterprise that the secure native application 314 may require to complete the task requested upon execution of the secure native application 314. The secure remote applications 322 executed by a secure application launcher 318 may be executed within the secure application launcher application 318. The virtualization applications 326 executed by a secure application launcher 318 may utilize resources on the mobile device 302, at the enterprise resources 304, and the like. The resources used on the mobile device 302 by the virtualization applications 326 executed by a secure application launcher 318 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 304, and the like. The resources used at the enterprise resources 304 by the virtualization applications 326 executed by a secure application launcher 318 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a GUI and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others may not be prepared or appropriate for deployment on the mobile device so the enterprise may elect to provide the mobile user access to the unprepared applications through virtualization techniques. As another example, the enterprise may have large complex applications with large and complex data sets (e.g. material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g. human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUI's and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like.

The applications running on the managed partition may be stabilized applications. The stabilized applications may be managed by a device manager 324. The device manager 324 may monitor the stabilized applications and utilize techniques for detecting and remedying problems that would result in a destabilized application if such techniques were not utilized to detect and remedy the problems.

The secure applications may access data stored in a secure data container 328 in the managed partition 310 of the mobile device. The data secured in the secure data container may be accessed by the secure wrapped applications 314, applications executed by a secure application launcher 318, virtualization applications 326 executed by a secure application launcher 318, and the like. The data stored in the secure data container 328 may include files, databases, and the like. The data stored in the secure data container 328 may include data restricted to a specific secure application 330, shared among secure applications 332, and the like. Data restricted to a secure application may include secure general data 334 and highly secure data 338. Secure general data may use a strong form of encryption such as AES 128-bit encryption or the like, while highly secure data 338 may use a very strong form of encryption such as AES 254-bit encryption. Data stored in the secure data container 328 may be deleted from the device upon receipt of a command from the device manager 324. The secure applications may have a dual-mode option 340. The dual mode option 340 may present the user with an option to operate the secured application in an unsecured mode. In an unsecured mode, the secure applications may access data stored in an unsecured data container 342 on the unmanaged partition 312 of the mobile device 302. The data stored in an unsecured data container may be personal data 344. The data stored in an unsecured data container 342 may also be accessed by unsecured applications 348 that are running on the unmanaged partition 312 of the mobile device 302. The data stored in an unsecured data container 342 may remain on the mobile device 302 when the data stored in the secure data container 328 is deleted from the mobile device 302. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 304 and enterprise services 308 at an enterprise, to the public Internet 348, and the like. The mobile device may connect to enterprise resources 304 and enterprise services 308 through virtual private network connections. The virtual private network connections may be specific to particular applications 350, particular devices, particular secured areas on the mobile device, and the like (e.g., 352). For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HTTP traffic, HTTPS traffic, application management traffic, and the like. The virtual private network connections may support and enable single-sign-on authentication processes 354. The single-sign-on processes may allow a user to provide a single set of authentication credentials, which are then verified by an authentication service 358. The authentication service 358 may then grant to the user access to multiple enterprise resources 304, without requiring the user to provide authentication credentials to each individual enterprise resource 304.

The virtual private network connections may be established and managed by an access gateway 360. The access gateway 360 may include performance enhancement features that manage, accelerate, and improve the delivery of enterprise resources 304 to the mobile device 302. The access gateway may also re-route traffic from the mobile device 302 to the public Internet 348, enabling the mobile device 302 to access publicly available and unsecured applications that run on the public Internet 348. The mobile device may connect to the access gateway via a transport network 362. The transport network 362 may be a wired network, wireless network, cloud network, local area network, metropolitan area network, wide area network, public network, private network, and the like.

The enterprise resources 304 may include email servers, file sharing servers, SaaS applications, Web application servers, Windows application servers, and the like. Email servers may include Exchange servers, Lotus Notes servers, and the like. File sharing servers may include SHAREFILE servers, other file sharing services, and the like. SaaS applications may include Salesforce, and the like. Windows application servers may include any application server that is built to provide applications that are intended to run on a local Windows operating system, and the like. The enterprise resources 304 may be premise-based resources, cloud based resources, and the like. The enterprise resources 304 may be accessed by the mobile device 302 directly or through the access gateway 360. The enterprise resources 304 may be accessed by the mobile device 302 via a transport network 362. The transport network 362 may be a wired network, wireless network, cloud network, local area network, metropolitan area network, wide area network, public network, private network, and the like.

The enterprise services 308 may include authentication services 358, threat detection services 364, device manager services 324, file sharing services 368, policy manager services 370, social integration services 372, application controller services 374, and the like. Authentication services 358 may include user authentication services, device authentication services, application authentication services, data authentication services and the like. Authentication services 358 may use certificates. The certificates may be stored on the mobile device 302, by the enterprise resources 304, and the like. The certificates stored on the mobile device 302 may be stored in an encrypted location on the mobile device, the certificate may be temporarily stored on the mobile device 302 for use at the time of authentication, and the like. Threat detection services 364 may include intrusion detection services, unauthorized access attempt detection services, and the like. Unauthorized access attempt detection services may include unauthorized attempts to access devices, applications, data, and the like. Device management services 324 may include configuration, provisioning, security, support, monitoring, reporting, and decommissioning services. File sharing services 368 may include file management services, file storage services, file collaboration services, and the like. Policy manager services 370 may include device policy manager services, application policy manager services, data policy manager services, and the like. Social integration services 372 may include contact integration services, collaboration services, integration with social networks such as Facebook, Twitter, and LinkedIn, and the like. Application controller services 374 may include management services, provisioning services, deployment services, assignment services, revocation services, wrapping services, and the like.

The enterprise mobility technical architecture 300 may include an application store 378. The application store 378 may include unwrapped applications 380, pre-wrapped applications 382, and the like. Applications may be populated in the application store 378 from the application controller 374. The application store 378 may be accessed by the mobile device 302 through the access gateway 360, through the public Internet 348, or the like. The application store may be provided with an intuitive and easy to use user interface. The application store 378 may provide access to a software development kit 384. The software development kit 384 may provide a user the capability to secure applications selected by the user by wrapping the application as described previously in this description. An application that has been wrapped using the software development kit 384 may then be made available to the mobile device 302 by populating it in the application store 378 using the application controller 374.

The enterprise mobility technical architecture 300 may include a management and analytics capability. The management and analytics capability may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 4:
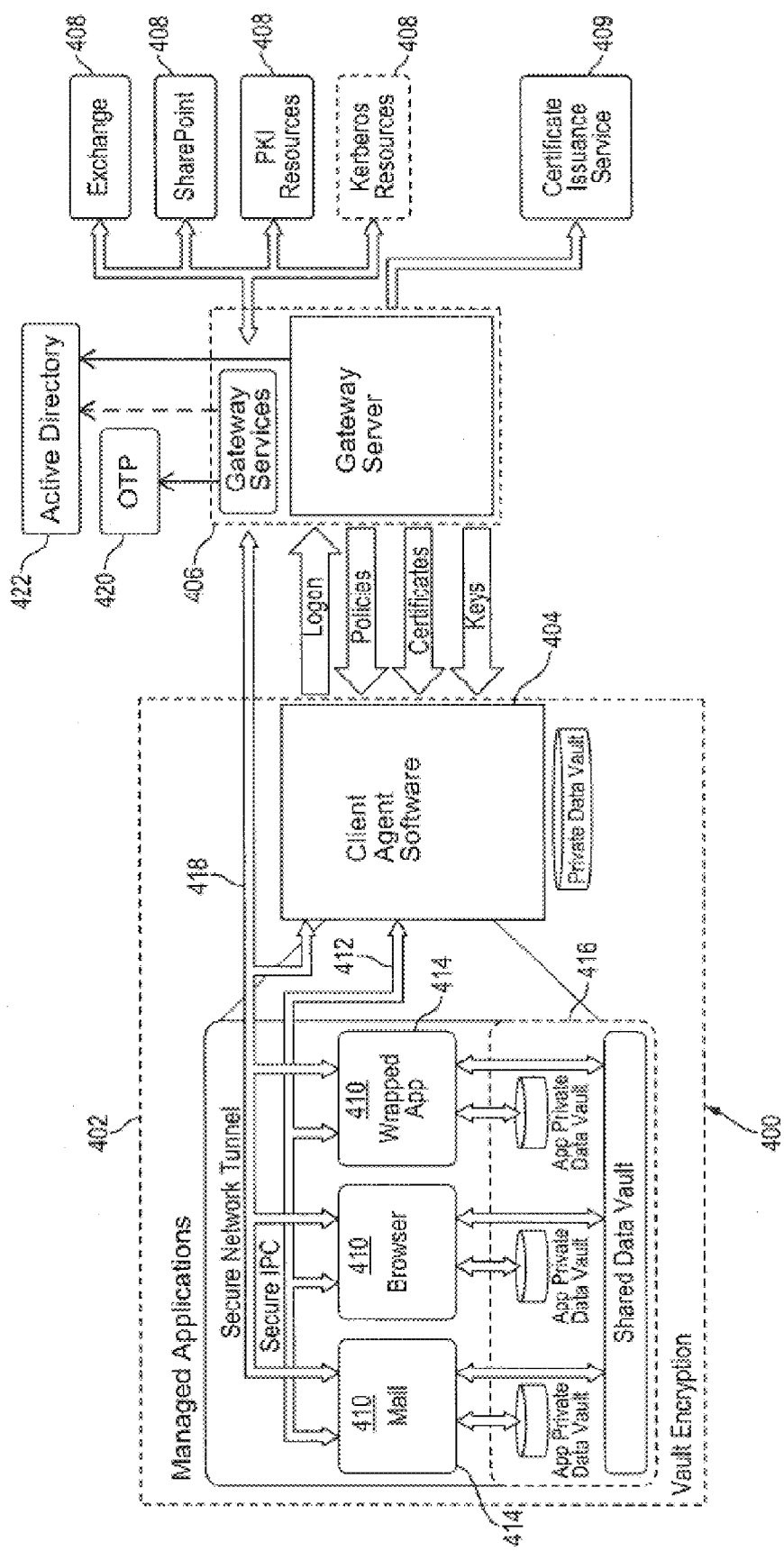
FIG. 4 depicts another illustrative enterprise mobility management system that may be used in accordance with one or more illustrative aspects described herein.

FIG. 4 is another illustrative enterprise mobility management system 400. Some of the components of the mobility management system 300 described above with reference to FIG. 3 have been omitted for the sake of simplicity. The architecture of the system 400 depicted in FIG. 4 is similar in many respects to the architecture of the system 300 described above with reference to FIG. 3 and may include additional features not mentioned above.

In this case, the left hand side represents an enrolled mobile device 402 (e.g., client 107, 212, 302, etc.) with a client agent 404, which interacts with gateway server 406 (which includes access gateway and application controller functionality) to access various enterprise resources 408 and services 409 such as Exchange, Sharepoint, PKI Resources, Kerberos Resources, and Certificate Issuance Service, as shown on the right hand side above. Although not specifically shown, the mobile device 402 may also interact with an enterprise application store (e.g., StoreFront) for the selection and downloading of applications. Client agent 404 may, for example, be a software application executing on a client device that facilitates communications with remote resources and/or virtualized resources. Gateway server 406 may, for example, be a server or other resource that provides access to enterprise resources and/or cloud resources.

The client agent 404 acts as the UI (user interface) intermediary for Windows apps/desktops hosted in an Enterprise data center, which are accessed using the HDX/ICA display remoting protocol, or any other remoting protocol. The client agent 404 also supports the installation and management of native applications on the mobile device 402, such as native iOS or Android applications. For example, the managed applications 410 (mail, browser, wrapped application) shown in the figure above are all native applications that execute locally on the device. Client agent 404 and an application management framework, such as MDX (mobile experience technology) by Citrix Systems Inc. of Fort Lauderdale, Fla. (other application management frameworks may also be used), act to provide policy driven management capabilities and features such as connectivity and SSO (single sign on) to enterprise resources/services 408. The client agent 404 handles primary user authentication to the enterprise, normally to the access gateway (AG) with SSO to other gateway server components. The client agent 404 obtains policies from gateway server 406 to control the behavior of the managed applications 410 on the mobile device 402. As used herein, a managed application is one that is capable of being controlled based on and operated in accordance with independently defined and communicated policy files.

The secure IPC links 412 between the native applications 410 and client agent 404 represent a management channel, which allows client agent to supply policies to be enforced by the application management framework 414 "wrapping" each application. The IPC channel 412 also allows client agent 404 to supply credential and authentication information that enables connectivity and SSO to enterprise resources 408. Finally the IPC channel 412 allows the application management framework 414 to invoke user interface functions implemented by client agent 404, such as online and offline authentication.

Communications between the client agent 404 and gateway server 406 are essentially an extension of the management channel from the application management framework 414 wrapping each native managed application 410. The application management framework 414 requests policy information from client agent 404, which in turn requests it from gateway server 406. The application management framework 414 requests authentication, and client agent 404 logs into the gateway services part of gateway server 406 (also known as NetScaler Access Gateway). Client agent 404 may also call supporting services on gateway server 406, which may produce input material to derive encryption keys for the local data vaults 416, or provide client certificates which may enable direct authentication to PKI protected resources, as more fully explained below.

In more detail, the application management framework 414 "wraps" each managed application 410. This may be incorporated via an explicit build step, or via a post-build processing step. The application management framework 414 may "pair" with client agent 614 on first launch of an application 410 to initialize the secure IPC channel and obtain the policy for that application. The application management framework 414 may enforce relevant portions of the policy that apply locally, such as the client agent login dependencies and some of the containment policies that restrict how local OS services may be used, or how they may interact with the application 410.

The application management framework 414 may use services provided by client agent 404 over the secure IPC channel 412 to facilitate authentication and internal network access. Key management for the private and shared data vaults 416 (containers) may be also managed by appropriate interactions between the managed applications 410 and client agent 404. Vaults 416 may be available only after online authentication, or may be made available after offline authentication if allowed by policy. First use of vaults 416 may require online authentication, and offline access may be limited to at most the policy refresh period before online authentication is again required.

Network access to internal resources may occur directly from individual managed applications 410 through access gateway 406. The application management framework 414 is responsible for orchestrating the network access on behalf of each application 410. Client agent 404 may facilitate these network connections by providing suitable time limited secondary credentials obtained following online authentication. Multiple modes of network connection may be used, such as reverse web proxy connections and end-to-end VPN-style tunnels 418.

The mail and browser managed applications 410 have special status and may make use of facilities that might not be generally available to arbitrary wrapped applications. For example, the mail application may use a special background network access mechanism that allows it to access Exchange over an extended period of time without requiring a full AD logon. The browser application may use multiple private data vaults to segregate different kinds of data.

This architecture supports the incorporation of various other security features. For example, gateway server 406 (including its gateway services) in some cases will not need to validate AD passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 406 may identify managed native applications 410 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 416 (containers) on the mobile device 402. The vaults 416 may be encrypted so that all on-device data including files, databases, and configurations are protected. For on-line vaults, the keys may be stored on the server (gateway server 406), and for off-line vaults, a local copy of the keys may be protected by a user password. When data is stored locally on the device 402 in the secure container 416, it is preferred that a minimum of AES 256 encryption algorithm be utilized.

Other secure container features may also be implemented. For example, a logging feature may be included, wherein all security events happening inside an application 410 are logged and reported to the backend. Data wiping may be supported, such as if the application 410 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase supplied by the user (if offline access is required). It may be XORed with another key randomly generated and stored on the server side if offline access is not required. Key derivation functions may operate such that keys generated from the user password use KDFs (key derivation functions, notably PBKDF2) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from application management framework 414 may be prevented in other ways. For example, when an application 410 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 420 without the use of an AD (active directory) 422 password for access to one or more applications. In some cases, some users do not know (or are not permitted to know) their AD password, so these users may authenticate using an OTP 420 such as by using a hardware OTP system like SecurID (OTPs may be provided by different vendors also, such as Entrust or Gemalto). In some cases, after a user authenticates with a user ID, a text is sent to the user with an OTP 420. In some cases, this may be implemented only for online use, with a prompt being a single field.

An offline password may be implemented for offline authentication for those applications 410 for which offline use is permitted via enterprise policy. For example, an enterprise may want the enterprise application store to be accessed in this manner. In this case, the client agent 404 may require the user to set a custom offline password and the AD password is not used. Gateway server 406 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 410 as secondary credentials (for the purpose of accessing PKI protected web resources via the application management framework micro VPN feature). For example, an application such as a corporate email application may utilize such a certificate. In this case, certificate-based authentication using ActiveSync protocol may be supported, wherein a certificate from the client agent 404 may be retrieved by gateway server 406 and used in a keychain. Each managed application may have one associated client certificate, identified by a label that is defined in gateway server 406.

Gateway server 406 may interact with an enterprise special purpose web service to support the issuance of client certificates to allow relevant managed applications to authenticate to internal PKI protected resources.

The client agent 404 and application management framework 414 may be enhanced to support obtaining and using client certificates for authentication to internal PKI protected network resources. More than one certificate may be supported, such as to match various levels of security and/or separation requirements. The certificates may be used by the mail and browser managed applications, and ultimately by arbitrary wrapped applications (provided those applications use web service style communication patterns where it is reasonable for application management framework to mediate HTTPS requests).

Application management framework client certificate support on iOS may rely on importing a PKCS 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 402 is authenticated to the enterprise, and vice versa. Virtual smart cards for authentication to gateway server 406 may also be implemented.

Both limited and full Kerberos support may be additional features. The full support feature relates to an ability to do full Kerberos login to AD 422, using an AD password or trusted client certificate, and obtain Kerberos service tickets to respond to HTTP negotiate authentication challenges. The limited support feature relates to constrained delegation in AFEE, where AFEE supports invoking Kerberos protocol transition so it can obtain and use Kerberos service tickets (subject to constrained delegation) in response to HTTP negotiate authentication challenges. This mechanism works in reverse web proxy (a.k.a. CVPN) mode, and when HTTP (but not HTTPS) connections are proxied in VPN and MicroVPN mode.

Another feature relates to application container locking and wiping, which may automatically occur upon jail-break or rooting detections, and occur as a pushed command from administration console, and may include a remote wipe functionality even when an application 410 is not running.

A multi-site architecture or configuration of the enterprise application store and application controller may be supported that allows users to be service from one of several different locations in case of failure.

In some cases, managed applications 410 may be allowed to access a certificate and private key via an API (example OpenSSL). Trusted managed applications 410 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Mobile Device Management Features

Having discussed several examples of the computing architecture and the enterprise mobility management architecture that may be used in providing and/or implementing various aspects of the disclosure, a number of embodiments will now be discussed in greater detail. In particular, and as introduced above, some aspects of the disclosure generally relate to providing mobile device management functionalities. In the description below, various examples illustrating how mobile device management functionalities may be provided in accordance with one or more embodiments will be discussed.

Figure 5:
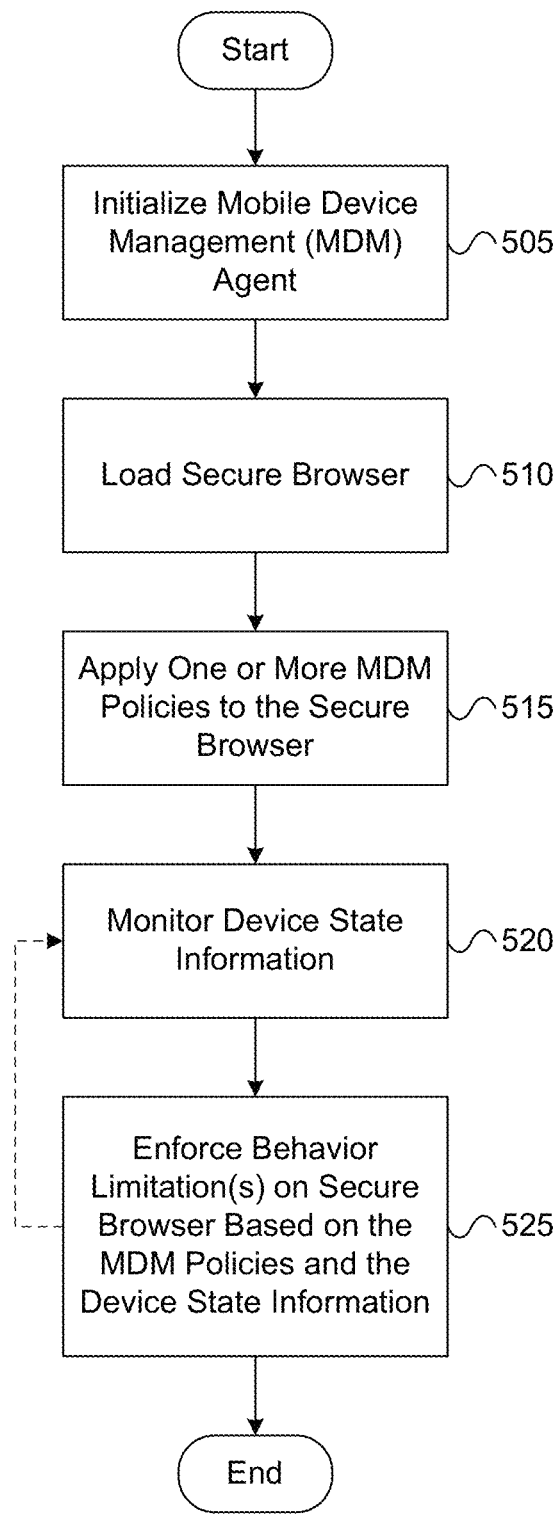
FIG. 5 depicts a flowchart that illustrates a method of applying one or more mobile device management policies to a managed browser in accordance with one or more illustrative aspects discussed herein.

FIG. 5 depicts a flowchart that illustrates a method of applying one or more mobile device management policies to a managed browser in accordance with one or more illustrative aspects discussed herein. In one or more embodiments, the method illustrated in FIG. 5 and/or one or more steps thereof may be performed by a computing device (e.g., generic computing device 201). In other embodiments, the method illustrated in FIG. 5 and/or one or more steps thereof may be embodied in computer-executable instructions that are stored in a computer-readable medium, such as a non-transitory computer-readable memory.

As seen in FIG. 5, the method may begin at step 505 in which a mobile device management (MDM) agent may be initialized. For example, in step 505, a computing device (e.g., a mobile computing device, such as a laptop computer, tablet computer, smart phone, or other type of mobile device) may initialize an MDM agent (e.g., by executing, configuring, and/or otherwise initiating the MDM agent) on the device. In one or more arrangements, the MDM agent may be an application, service, or process that is configured to run on the device and is further configured to collect and/or otherwise obtain information about device, including information about the current state of the device. For example, the MDM agent may be configured to collect and/or maintain device-level state information, such as state information that is indicative of the operating systems and/or applications that are stored on and/or running on the device, state information that is indicative of the network connections that are available to and/or being used by the device, and/or state information that is indicative of the current location of where the device is located and/or being used (e.g., in terms of geographic coordinates; in terms of semantic labels, such as "home" or "work;" etc.). While these types of state information are listed here as examples of the types of device-level state information that may be collected and/or maintained by the MDM agent in some instances, additional and/or alternative types of state information may be similarly collected and/or maintained by the MDM agent in other instances.

In addition to collecting and maintaining various types of state information, the MDM agent may be further configured to evaluate, analyze, and/or otherwise monitor the various types of state information being collected. For example, the MDM agent may be configured to periodically determine whether state information has changed and/or execute one or more actions based on detected changes in the state information. In some instances, the MDM agent may provide the state information to one or more other applications, services, and/or processes. For instance, in some examples discussed below, the MDM agent and/or one or more other applications, services, and/or processes on the device may analyze and/or otherwise process the state information collected by the MDM agent in enforcing mobile device management policies and/or performing other actions in connection with mobile device management policies. For instance, some mobile device management policies may define permitted and/or prohibited functions and/or applications based on different sets of circumstances that may be evaluated using the device state information collected by the MDM agent. In these and/or other ways, the state information may be used in enforcing behavior limitations on various functions and/or applications, such as a managed browser in the examples discussed below.

By collecting, maintaining, evaluating, analyzing, and/or otherwise monitoring device-level state information (which may, e.g., include information about what applications are installed and/or running on the device, where the device is located, what networks the device is connected to, and/or other device-level considerations that may, for instance, be distinguished from application-level considerations), a computing device and/or an MDM agent running on a computing device may be able to evaluate and make one or more policy decisions that cannot be made based only on information known by a single application. As a result, such a computing device and/or an MDM agent may be able to provide more control over policy management and enforcement than some conventional application management frameworks (which may, e.g., evaluate and make policy decisions based only on application-level information and, as a result, may fail to provide the same level of functionality as can be provided when device-level state information is used).

In some embodiments, after an MDM agent is initialized on a computing device (e.g., in step 505), the computing device and/or the MDM agent running on the computing device may provide information to, and/or may receive one or more commands from, one or more policy management servers (which may, e.g., impact the state of the device). For example, in providing information to one or more policy management servers, the computing device and/or the MDM agent running on the computing device may send state information (which may, e.g., include various types of device state information as discussed herein) to the one or more policy management servers, which may, for instance, be configured to analyze such information and provide commands and/or other information back to the computing device and/or the MDM agent running on the computing device. In addition, in receiving commands from one or more policy management servers, the computing device and/or the MDM agent running on the computing device may receive new and/or updated policies and/or other policy information, remotely analyzed and/or otherwise processed device state information (e.g., the one or more policy management servers may remotely analyze and/or otherwise process state information collected by, obtained from, and/or related to the device, and then provide such analyzed and/or processed state information back to the device), and/or other information.

In step 510, a managed browser may be loaded. For example, in step 510, the computing device (e.g., the computing device that initialized the MDM agent in step 505) may load a managed browser (e.g., by opening and/or otherwise initiating execution of the managed browser). In some embodiments, the managed browser may be a web browser that is configured to provide one or more enterprise security features. For example, the managed browser may be configured to provide and/or operate in a "managed" mode in which one or more mobile device management policies (which may, e.g., be defined and/or distributed by an enterprise) may be enforced on the browser (e.g., such that various functions of the browser, including the browser's ability to access and/or interact with enterprise resources and/or other content may be restricted in accordance with one or more policies and/or based on device state information), and the managed browser may be configured to provide and/or operate in an "unmanaged" mode in which policies might not be enforced, but the browser's ability to access specific resources, including one or more enterprise resources, may be restricted. Additionally or alternatively, the managed browser may extend various enterprise security features for use with mobile device applications that may be configured to run within the browser. For example, an enterprise may require some or all of its employees and/or other users to install and use the managed browser on their respective mobile devices in a bring-your-own-device (BYOD) scheme to reduce enterprise security risks. In addition, the managed browser can, for instance, be used to enable mobile device users to access a corporate intranet and/or other enterprise resources without connecting to a virtual private network (VPN). For instance, the managed browser may implement and/or provide tunneling functionalities, such as those discussed in greater detail below, to enable such access to a corporate intranet and/or other enterprise resources.

In step 515, one or more mobile device management policies may be applied to the managed browser. For example, in step 515, the computing device and/or the MDM agent running on the computing device may apply one or more policies to the managed browser, such that certain functions of the managed browser may be selectively enabled and/or disabled based on the state information being collected by the MDM agent. In one or more arrangements, the mobile device management policies that are applied to the managed browser may additionally or alternatively control functionalities of the computing device during execution of the managed browser. In some instances, the mobile device management policies may additionally or alternatively control functionalities of the computing device even when the managed browser is not being executed on the computing device (e.g., and is instead merely present on the computing device).

In some embodiments, applying the one or more mobile device management policies to the managed browser may include providing state information to one or more policy management servers and receiving management information from the one or more policy management servers. For example, in applying the one or more mobile device management policies to the managed browser (e.g., in step 515), the computing device and/or the MDM agent running on the computing device may provide state information (which may, e.g., include at least some of the state information being monitored by the MDM agent loaded in step 505) to one or more policy management servers by connecting to, and subsequently sending state information to, the one or more policy management servers. The one or more policy management servers may, for instance, be operated and/or controlled by an enterprise that is distributing and/or otherwise implementing the one or more policies which are to be applied to the managed browser. Additionally or alternatively, the one or more policy management servers may be configured to analyze state information (which, e.g., may be received from one or more MDM agents on one or more devices) and generate management information (which, e.g., may then be provided to, and subsequently received by, the one or more MDM agents on one or more devices). For example, after providing the state information to the one or more policy management servers, the computing device and/or the MDM agent running on the computing device may receive management information from the one or more policy management servers, and such management information may be generated by the one or more policy management servers based on the provided state information. In some instances, the management information may include one or more commands to be executed by the computing device and/or by the MDM agent. For example, the management information may include one or more commands that, when executed, cause the computing device and/or the MDM agent to selectively enable and/or selectively disable one or more functions of the managed browser. In other instances, the management information may include one or more policy updates. For example, the management information may include one or more policy updates that reflect one or more new and/or updated policies to be applied to the managed browser.

In some embodiments, at least one policy of the one or more mobile device management policies may be received from a policy management server. For example, the computing device and/or the MDM agent on the computing device may receive one or more policies from a policy management server that is controlled and/or used by the enterprise, which may send and/or otherwise provide the one or more policies to the computing device and/or the MDM agent on the computing device to be applied to the managed browser on the computing device. In some instances, the mobile device management policies that are received from the policy management server may be generic policies that are configured to be applied to all users associated with the enterprise. In other instances, the mobile device management policies that are received from the policy management server may be user-specific policies that are configured to be applied to the particular user of the computing device and/or role-specific policies that are configured to be applied to users having a particular role (e.g., sales, accounting, legal, engineering, executive, etc.) within the enterprise.

In step 520, state information associated with the device may be monitored. For example, in step 520, the computing device and/or the MDM agent running on the computing device may monitor state information that is indicative of the current state of the computing device (e.g., by collecting, obtaining, evaluating, and/or analyzing such state information). As discussed above, some examples of the types of the device state information that may be monitored by the MDM agent may include information about the operating systems and/o applications that are stored on and/or running on the device, information about the network connections that are available to and/or being used by the device, and/or information about the current location of the device.

In step 525, one or more behavior limitations may be enforced on the managed browser. For example, in step 525, the computing device and/or the MDM agent running on the computing device may enforce one or more behavior limitations on the managed browser based on the state information (e.g., the state information collected and/or analyzed during the monitoring of step 520). For instance, in enforcing one or more behavior limitations on the managed browser, the computing device and/or the MDM agent running on the computing device may disable certain functions within the managed browser based on the state information indicating, e.g., that the computing device is located in a particular place or being used in a certain way. For example, certain functions might be disabled within the managed browser to prevent a user from accessing enterprise resources and/or other enterprise data if location information included in the state information indicates that the device is being used in a location that has not been previously registered as the user's home location or work location.

In some embodiments, enforcing the one or more behavior limitations on the managed browser may include restricting access to at least one network resource. For example, in enforcing the one or more behavior limitations on the managed browser to restrict access to one or more network resources, the computing device and/or the MDM agent running on the computing device may limit, block, and/or otherwise control access to certain websites and/or other network-accessible information (e.g., using a blacklist of prohibited websites, a whitelist of permitted websites, etc.). In some instances, restricting access to one or more network resources may include limiting, blocking, and/or otherwise controlling access to enterprise resources and/or other enterprise data that may be accessible via one or more public and/or private networks.

In some embodiments, enforcing the one or more behavior limitations on the managed browser may include selectively disabling at least one function of the managed browser based on location information associated with the computing device. For example, in enforcing the one or more behavior limitations on the managed browser, the computing device and/or the MDM agent running on the computing device may apply one or more location-based policies to the managed browser that selectively restrict and/or permit certain functions of the managed browser when the device is in certain locations. For instance, a location-based policy may prevent the managed browser (and/or one or more functions within the managed browser) from being used when the device is or is not in one or more particular locations. Another location-based policy may, for instance, limit the websites, applications, and/or other resources that can be accessed using the managed browser when the device is or is not in one or more particular locations. In some instances, a location-based policy may define one or more areas in which the policy does or does not apply, and the one or more areas may be defined geographically (e.g., in terms of geographic coordinates) and/or semantically (e.g., using labels such as "home" or "work").

In some embodiments, enforcing the one or more behavior limitations on the managed browser may include selectively disabling at least one function of the managed browser based on application inventory information associated with the computing device. For example, in enforcing the one or more behavior limitations on the managed browser, the computing device and/or the MDM agent running on the computing device may selectively disable one or more functions of the managed browser based on application inventory information associated with the computing device. Such application inventory information may, for instance, include a listing of the applications that are running on the computing device, installed on the computing device, and/or otherwise present on the computing device, as well as status information about each of the applications included in the listing (e.g., indicating whether the application is open, whether the application is being executed locally, whether the application is being executed remotely, whether the application is being run inside the managed browser, etc.) and/or other information about the applications. For instance, if one or more specific applications are running on the computing device, installed on the computing device, and/or otherwise present on the computing device, the computing device and/or the MDM agent running on the computing device may determine to selectively disable one or more functions of the managed browser, which may, in some instances, include selectively preventing the managed browser from accessing specific enterprise resources, modifying specific enterprise data, and/or executing other functions.

In some embodiments, enforcing the one or more behavior limitations on the managed browser may include selectively wiping one or more caches associated with the managed browser. For example, in enforcing the one or more behavior limitations on the managed browser, the computing device and/or the MDM agent running on the computing device may apply one or more cache-clearing policies to the managed browser that cause one or more caches of the managed browser to be selectively wiped (e.g., by the computing device, by the MDM agent running on the computing device, by the managed browser itself, etc.) in certain circumstances. For instance, a cache-clearing policy may cause one or more caches of the managed browser to be selectively wiped based on the state information indicating that the device is being used in a particular location and/or being used in a particular way. In selectively wiping a cache of the managed browser, the computing device and/or the MDM agent running on the computing device may delete all of the data included in the cache or only some of the data included in the cache (e.g., only managed enterprise data may be deleted, while unmanaged personal data might not be deleted). Additionally or alternatively, a cache-clearing policy may be used by a network administrator to actively initiate a process in which one or more caches of one or more managed browsers (e.g., on various devices) are wiped.

In some embodiments, applying one or more mobile device management policies to the managed browser may include determining that a first set of policies of one or more sets of policies is applicable to a user of the managed browser based on identity information associated with the user, and subsequently determining to apply the first set of policies to the managed browser. For example, different policies may be applied for different users of the managed browser. In applying one or more mobile device management policies to the managed browser, the computing device and/or the MDM agent running on the computing device thus may determine an appropriate set of policies to be applied based on identity information about the current user of the computing device (e.g., based on a user account that is currently logged into the computing device). Specific sets of policies may, for instance, be imposed on particular users and/or particular groups of users. For example, a first set of policies may be applied when a user is part of a first group within the enterprise or has a first role within the enterprise, and a second set of policies (which may, e.g., be different from the first set of policies) may be applied when the user is part of a second group within the enterprise or has a second role within the enterprise (which may, e.g., be different from the first role).

Figure 6:
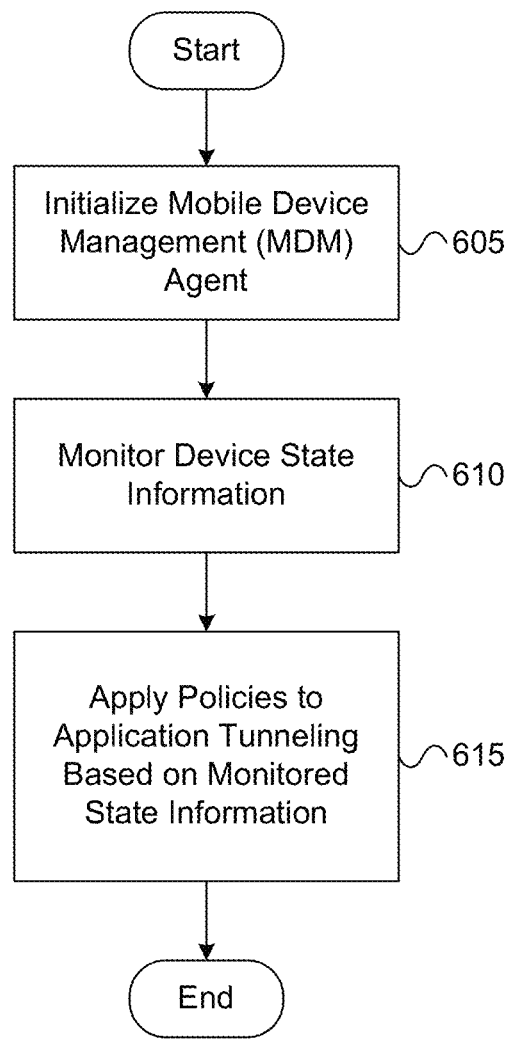
FIG. 6 depicts a flowchart that illustrates a method of applying one or more mobile device management policies to application tunneling functionalities in accordance with one or more illustrative aspects discussed herein.

FIG. 6 depicts a flowchart that illustrates a method of applying one or more mobile device management policies to application tunneling functionalities in accordance with one or more illustrative aspects discussed herein. In one or more embodiments, the method illustrated in FIG. 6 and/or one or more steps thereof may be performed by a computing device (e.g., generic computing device 201). In other embodiments, the method illustrated in FIG. 6 and/or one or more steps thereof may be embodied in computer-executable instructions that are stored in a computer-readable medium, such as a non-transitory computer-readable memory.

As seen in FIG. 6, the method may begin at step 605 in which a mobile device management (MDM) agent may be initialized. For example, in step 605, a computing device (e.g., a mobile computing device, such as a laptop computer, tablet computer, smart phone, or other type of mobile device) may initialize an MDM agent, similar to how such an MDM agent may be initialized in step 505 (discussed above). In one or more arrangements, after an MDM agent is initialized on a computing device (e.g., in step 605), the computing device and/or the MDM agent running on the computing device may provide information to, and/or may receive one or more commands from, one or more policy management servers (which may, e.g., impact the state of the device), similar to how such information may be provided and how such commands may be received in the examples discussed above.

In step 610, state information associated with a mobile computing device may be monitored by the mobile device management agent. For example, in step 610, the mobile computing device and/or the MDM agent running on the mobile computing device may collect, maintain, evaluate, analyze, and/or otherwise monitor various types of state information, similar to how such state information may be monitored by the MDM agent and/or the computing device in the examples discussed above (e.g., with respect to FIG. 5).

In some embodiments, monitoring the state information may include providing at least some of the state information to one or more policy management servers and receiving management information from the one or more policy management servers. For example, in monitoring the state information (e.g., in step 610), the computing device and/or the MDM agent running on the computing device may provide at least some of the state information monitored by the MDM agent to one or more policy management servers by connecting to, and subsequently sending the state information to, the one or more policy management servers. The one or more policy management servers may, for instance, be operated and/or controlled by an enterprise that is distributing and/or otherwise implementing one or more policies to be applied to application tunneling functionalities, as discussed below. Additionally or alternatively, the one or more policy management servers may be configured to analyze state information (which, e.g., may be received from one or more MDM agents on one or more devices) and generate management information (which, e.g., may then be provided to, and subsequently received by, the one or more MDM agents on one or more devices). For example, after providing the state information to the one or more policy management servers, the computing device and/or the MDM agent running on the computing device may receive management information from the one or more policy management servers, and such management information may be generated by the one or more policy management servers based on the provided state information. In some instances, the management information may include one or more commands to be executed by the computing device and/or by the MDM agent. For example, the management information may include one or more commands that, when executed, cause the computing device and/or the MDM agent to selectively enable and/or selective disable application tunneling functionalities for one or more specific applications, as discussed below. In other instances, the management information may include one or more policy updates. For example, the management information may include one or more policy updates that reflect one or more new and/or updated policies to be applied to the application tunneling functionalities.

In some embodiments, monitoring the state information may include identifying one or more applications that are present on the mobile computing device. For example, in identifying one or more applications that are present on the mobile computing device, the mobile computing device and/or the MDM agent running on the mobile computing device may inspect one or more storage devices (which may, e.g., be connected to and/or otherwise accessible to the computing device) and/or installation logs (which may, e.g., be maintained by the computing device) to determine what application(s) are stored on the computing device, installed on the computing device, previously run on the computing device, and/or currently running on the computing device.

In some embodiments, monitoring the state information may include identifying one or more network connections that are used by the mobile computing device. For example, in identifying one or more network connections that are used by the mobile computing device, the mobile computing device and/or the MDM agent running on the mobile computing device may inspect one or more network interfaces and/or other network devices (which may, e.g., be connected to and/or otherwise usable by the computing device) and/or one or more connection logs (which may, e.g., be maintained by the computing device) to determine what network(s) are accessible to and/or in range of the computing device, what network(s) that computing device has previously connected to, and/or what network(s) the computing device is currently connected to.

In some embodiments, monitoring the state information may include determining current location information for the mobile computing device. For example, in determining current location information for the mobile computing device, the mobile computing device and/or the MDM agent running on the mobile computing device may determine and/or cause one or more other components (e.g., a GPS receiver, other positioning components, etc.) and/or devices to determine a current position of the mobile computing device. In some instances, the location information may include geographic coordinates that are indicative of the current position of the mobile computing device. In some instances, the location information may include semantic labels that are indicative of the current position of the mobile computing device relative to one or more user-specific landmarks (e.g., "home" or "work"). Any and/or all of this location may, for instance, be used by the mobile computing device and/or by the MDM agent running on the mobile computing device in applying and/or enforcing one or more location-based mobile device management policies.

In step 615, one or more policies may be applied to application tunneling functionalities on the mobile computing device based on the monitored state information. For example, in step 615, the mobile computing device and/or the MDM agent running on the mobile computing device may apply one or more mobile device management policies to application tunneling functionalities on the computing device, such that certain aspects of the application tunneling functionalities may be selectively enabled and/or disabled based on the state information being monitored by the MDM agent. In one or more arrangements, the application tunneling functionalities may, for instance, enable particular applications and/or other processes running on the mobile computing device to establish VPN-style tunnels to enterprise servers and/or other enterprise resources (which may, e.g., enable such applications to securely access enterprise data).

In some embodiments, applying the one or more policies to the application tunneling functionalities on the mobile computing device may include enabling at least one application tunnel. For example, in enabling at least one application tunnel, the computing device and/or the MDM agent running on the computing device may, based on one or more mobile device management policies (which may, e.g., dictate circumstances in which applications tunnels can and/or cannot be established to specific resources, including specific enterprise resources), permit and/or establish one or more application tunnels to one or more resources (which may, e.g., include one or more enterprise resources). In permitting and/or establishing the one or more application tunnels, the computing device and/or the MDM agent running on the computing device may evaluate one or more mobile device management policies in view of device state information to determine whether an application tunnel can be permitted to be established to a specific resource (which may, e.g., be an enterprise resource). If, for instance, the computing device and/or the MDM agent running on the computing device determines that the application tunnel can be permitted to be established to the specific resource, then the computing device and/or the MDM agent running on the computing device may establish the application tunnel and/ or cause the application tunnel to be established (e.g., by connecting to and/or otherwise communicating with the specific resource). If, on the other hand, the computing device and/or the MDM agent running on the computing device determines that the application tunnel cannot be permitted to be established to the specific resource, then the computing device and/or the MDM agent running on the computing device may prevent the application tunnel from being established.

In some embodiments, at least one policy of the one or more policies (that, e.g., are applied to the application tunneling functionalities) may be received from a policy management server. For example, before applying the one or more policies to the application tunneling functionalities, the computing device and/or the MDM agent running on the computing device may receive one or more policies from a policy management server, and the one or more received policies may, for instance, define specific circumstances in which certain application tunneling functionalities should be selectively enabled and/or selectively disabled for specific applications and/or services. After receiving such policies from such a policy management server (which may, e.g., be operated and/or controlled by an enterprise that is implementing the policies), the computing device and/or the MDM agent running on the computing device then may apply one or more of the received policies to the application tunneling functionalities on the mobile computing device (e.g., by selectively enabling and/or selectively disabling applying tunneling functionalities for specific applications in accordance with the policies and/or based on device state information).

In some embodiments, applying the one or more policies to the application tunneling functionalities on the mobile computing device may include selectively disabling the application tunneling functionalities for one or more applications on the mobile computing device based on the monitored state information. For example, in selectively disabling the application tunneling functionalities for one or more applications, the computing device and/or the MDM agent running on the computing device may, based on one or more mobile device management policies (which may, e.g., dictate how state information affects application tunneling functionalities), determine to disable and/or subsequently disable application tunneling functionalities for a particular application based on the state information indicating that certain conditions are and/or are not met. For instance, the computing device and/or the MDM agent running on the computing device may selectively disable application tunneling functionalities for one or more applications based on certain application(s) being present on the device, based on the device being connected to certain network(s), and/or based on the device being located in a particular location.

In some embodiments, applying the one or more policies to the application tunneling functionalities on the mobile computing device may include selectively enabling and/or selectively disabling tunneling to one or more specific resources. For example, in selectively enabling and/or selectively disabling tunneling to one or more specific resources, the computing device and/or the MDM agent running on the computing device may, based on one or more mobile device management policies, the computing device and/or the MDM agent may selectively activate and/or allow one or more specific applications and/or other processes to establish and/or use tunnels to one or more specific enterprise resources. Additionally or alternatively, in selectively enabling and/or selectively disabling tunneling to one or more specific resources, the computing device and/or the MDM agent running on the computing device may selectively prohibit and/or prevent one or more specific applications and/or other processes from establishing and/or otherwise using tunnels from one or more specific enterprise resources. In addition, the computing device and/or the MDM agent running on the computing device may, for instance, determine to selectively enable and/or selectively disable tunneling to one or more specific resources based on one or more mobile device management policies and/or based on device state information (which may, e.g., monitored by the computing device and/or by the MDM agent, as discussed above). Thus, changes in device state information may cause the computing device and/or the MDM agent running on the computing device to selectively enable and/or selectively disable tunneling to one or more specific enterprise resources.

In some embodiments, applying the one or more policies to the application tunneling functionalities on the mobile computing device may include restricting content that is exchangeable via the application tunneling functionalities. For example, in restricting the content that is exchangeable via the application tunneling functionalities, the computing device and/or the MDM agent running on the computing device may, based on one or more mobile device management policies, determine to prevent and/or subsequently prevent one or more types of data from being sent and/or received via VPN-style tunnels that may be established and/or used by various applications in accessing and/or interacting with various enterprise resources. For instance, the computing device and/or the MDM agent running on the computing device may prevent certain types of data, such as highly-secure data or extremely confidential data, from being exchanged via the application tunneling functionalities based on certain application(s) being present on the device, based on the device being connected to certain network(s), and/or based on the device being located in a particular location.

In some embodiments, applying the one or more policies to the application tunneling functionalities on the mobile computing device may include restricting operations that are performable via the application tunneling functionalities. For example, in restricting the operations that are performable via the application tunneling functionalities, the computing device and/or the MDM agent running on the computing device may, based on one or more mobile device management policies, prevent certain types of operations from being performed via VPN-style tunnels that may be established and/or used by various applications in accessing and/or interacting with various enterprise resources. For instance, the computing device and/or the MDM agent running on the computing device may prevent certain types of operations, such as write operations, from being performed (e.g., while allowing read operations to be performed) based on certain application(s) being present on the device, based on the device being connected to certain network(s), and/or based on the device being located in a particular location.

Figure 7:
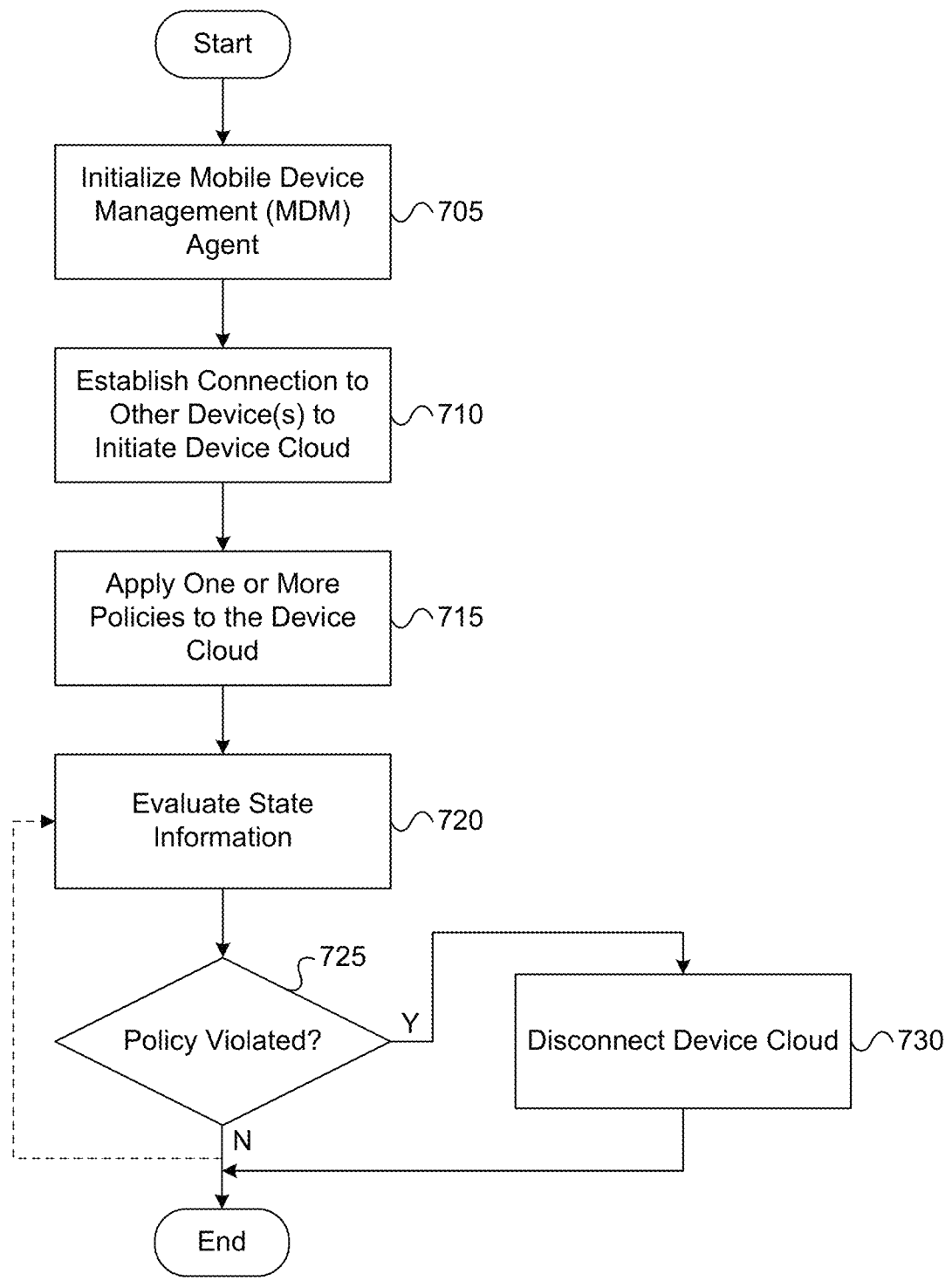
FIG. 7 depicts a flowchart that illustrates a method of applying one or more mobile device management policies to a device cloud in accordance with one or more illustrative aspects discussed herein.

FIG. 7 depicts a flowchart that illustrates a method of applying one or more mobile device management policies to a device cloud in accordance with one or more illustrative aspects discussed herein. In one or more embodiments, the method illustrated in FIG. 7 and/or one or more steps thereof may be performed by a computing device (e.g., generic computing device 201). In other embodiments, the method illustrated in FIG. 7 and/or one or more steps thereof may be embodied in computer-executable instructions that are stored in a computer-readable medium, such as a non-transitory computer-readable memory.

As seen in FIG. 7, the method may begin at step 705 in which a mobile device management (MDM) agent may be initialized. For example, in step 705, a computing device (e.g., a mobile computing device, such as a laptop computer, tablet computer, smart phone, or other type of mobile device) may initialize an MDM agent, similar to how such an MDM agent may be initialized in step 505 (discussed above). In one or more arrangements, after an MDM agent is initialized on a computing device (e.g., in step 705), the computing device and/or the MDM agent running on the computing device may provide information to, and/or may receive one or more commands from, one or more policy management servers (which may, e.g., impact the state of the device), similar to how such information may be provided and how such commands may be received in the examples discussed above. For example, after providing at least some of the monitored state information to the one or more policy management servers, the computing device and/or the MDM agent running on the computing device may receive one or more commands from the one or more policy management servers based on the state information that was provided (e.g., as the one or more policy management servers may receive the provided state information, analyze the provided state information in view of one or more mobile device management policies, generate one or more commands based on the provided state information and/or based on the one or more policies, and return the generated commands to the computing device and/or the MDM agent running on the computing device).

In step 710, a connection may be established to at least one other device to initiate a device cloud. For example, in step 710, the computing device may establish a network connection to one or more other computing devices to initiate a device cloud. In one or more arrangements, a device cloud may, for instance, enable two or more computing devices to be used in combination with each other to perform a single function or task. In typical instances, the devices may be used by the same user and/or both may be located near each other (e.g., within a predetermined distance of each other) and/or near the user (e.g., within a predetermined distance of the user). In some instances, a device cloud may be used to provide a function that is not supported by one of the user's devices, but is supported by another one of the user's devices. For example, a user of a laptop computer may wish to conduct a video conference with another person, but the laptop computer might not include a camera. If the user also has a smart phone (or other computing device) that includes a camera, however, a device cloud may be used to dynamically link the functionalities provided by the two devices so that they may be used in providing the video conference. In particular, in this example, a device cloud may be established such that the user's smart phone may be used as a video input device for the video conference, while the user's laptop computer can be used to perform other functions that may be involved in conducting the video conference (e.g., establishing the connection to the other person's device(s), providing text-based chat functionalities, etc.). While this example illustrates some ways in which a device cloud may be used to extend the functionalities of one or more devices in some embodiments, such a device cloud may be used in other ways to extend additional and/or alternative functionalities of various devices in other embodiments.

In one or more arrangements, the two or more computing devices that may be involved in a device cloud may communicate in various ways (e.g., to exchange information to facilitate the one or more functions that may be provided via device cloud). For example, the two or more computing devices may communicate using wireless LAN (WLAN) interfaces and/or signals, cellular interfaces and/or signals, Bluetooth interfaces and/or signals, and/or any other communication interfaces and/or signals. In some instances, an orchestration engine executing on one or more of the computing devices involved in the device cloud may manage interactions and/or other communications between the computing devices involved in the device cloud.

In step 715, one or more policies may be applied to the device cloud. In one or more embodiments, the one or more policies may be configured to allocate a first role to the computing device and a second role to the at least one other device that is participating in the device cloud. For example, in step 715, the computing device and/or the MDM agent running on the computing device may apply one or more mobile device management policies to the device cloud established in step 710. Additionally or alternatively, the one or more mobile device management policies may define different roles to be performed by each of the devices involved in the device cloud. For instance, in the example discussed above involving a video conference, the mobile device management policies may allocate a video capturing role to the smart phone involved in the device cloud, and the mobile device management policies may allocate a connection maintenance role to the laptop computer involved in the device cloud. In addition, in applying one or more policies to the device cloud, the computing device and/or the MDM agent running on the computing device may monitor state information being collected by the MDM agent (e.g., similar to how such state information may be monitored in the examples discussed above) and subsequently may enforce the one or more policies based on the state information.

In some embodiments, the one or more policies applied to the device cloud may be configured to control whether one or more specific devices can connect to and/or participate in the device cloud and/or one or more other device clouds. In instances in which such policies are applied to the device cloud, the computing device and/or the MDM agent running on the computing device may, for example, periodically monitor the devices that are participating in, requesting access to, and/or are otherwise involved in the device cloud. Such monitoring may, for instance, enable the computing device and/or the MDM agent running on the computing device to determine whether a particular device can join the device cloud and/or whether a particular device should be removed from the device cloud.

In some embodiments, applying the one or more policies to the device cloud may include restricting at least one function on the computing device. For example, in applying one or more policies to the device cloud, the computing device and/or the MDM agent running on the computing device may selectively enable, selectively disable, and/or otherwise control one or more functions on the computing device. Additionally or alternatively, in applying one or more policies to the device cloud, the computing device and/or the MDM agent running on the computing device may cause one or more functions on the other computing device(s) participating in the device cloud to be selectively enabled, selectively disabled, and/or otherwise controlled. In some instances, the mobile device management policies that are applied to the device cloud (e.g., by the computing device and/or by the MDM agent) may selectively enable and/or disable certain functionalities while the device cloud is connected and/or after a device cloud session has been concluded (e.g., after the device cloud is disconnected). For example, the mobile device management policies that are applied to the device cloud may prevent a user of the computing device from accessing and/or editing enterprise data and/or enterprise resources while the device cloud is connected. In another example, the mobile device management policies that are applied to the device cloud may prevent a user of the computing device from copying and/or pasting enterprise data to one or more chat windows while the device cloud is connected.

In some embodiments, applying the one or more policies to the device cloud includes controlling at least one application on the computing device. For example, in applying the one or more policies to the device cloud, the computing device and/or the MDM agent running on the computing device may selectively enable, selectively disable, and/or otherwise control one or more applications on the computing device. Additionally or alternatively, in applying one or more policies to the device cloud, the computing device and/or the MDM agent running on the computing device may cause one or more applications on the other computing device(s) participating in the device cloud to be selectively enabled, selectively disabled, and/or otherwise controlled. In some instances, the mobile device management policies that are applied to the device cloud (e.g., by the computing device and/or by the MDM agent) may selectively enable and/or disable certain applications while the device cloud is connected and/or after a device cloud session has been concluded (e.g., after the device cloud is disconnected).

In some embodiments, controlling at least one application on the computing device may include disabling the application. For example, in applying one or more policies to the device cloud and/or in controlling an application, the computing device and/or the MDM agent running on the computing device may disable an application (e.g., by preventing the application from being opened and/or executed, by closing the application if it is already open, etc.).

In some embodiments, controlling at least one application on the computing device may include causing one or more applications involved in the device cloud to create an application tunnel. For example, in applying one or more policies to the device cloud and/or in controlling an application, the computing device and/or the MDM agent running on the computing device may cause one or more applications (which may, e.g., be running on the device and/or running on one or more other devices participating in the device cloud) to create one or more VPN style tunnels (e.g., to access and/or otherwise interact with one or more enterprise resources).

In step 720, state information associated with the computing device may be evaluated. For example, in step 720, the computing device and/or the MDM agent running on the computing device may evaluate various types of state information that may have been collected and/or monitored by the MDM agent. In some instances, in evaluating the state information, the computing device and/or the MDM agent running on the computing device may analyze network connection information associated with the computing device. Such network connection information may, for instance, include information identifying what network(s) the device is connected to, various properties associated with the identified network(s), and/or other information associated with networks and/or network connections that are being used by and/or are available to the computing device. Additionally or alternatively, in evaluating the state information, the computing device and/or the MDM agent running on the computing device may analyze location information associated with the computing device. Such location information may, for instance, include information identifying where the device is currently located, where the device has been previously located, in which direction and/or at what speed the device may be traveling, and/or other information indicative of the current location of the device.

In some embodiments, the state information that is evaluated in step 720 may include state information that is associated with the at least one other device participating in the device cloud. For example, in step 720, the computing device and/or the MDM agent running on the computing device may additionally or alternatively evaluate state information that is obtained from and/or otherwise associated with the one or more other devices that are participating in the device cloud. The state information obtained from the other device(s) may be similar to the state information being monitored by the MDM agent and may, for instance, include information about what programs are present on the other devices, whether the other devices are located, what networks the other devices are connected to, and so on.

In step 725, it may be determined, based on the state information, whether at least one policy of the one or more policies has been violated. For example, in step 725, the computing device and/or the MDM agent running on the computing device may determine, based on the state information evaluated in step 720 (which may, e.g., include location information and/or network connection information, as discussed above), whether one or more of the policies that were applied to the device cloud in step 710 have been violated.

If it is determined, in step 725, that at least one policy of the one or more policies has been violated, then in step 730, the device cloud may be disconnected. For example, in step 730, the computing device and/or the MDM agent running on the computing device may disconnect the connection the device cloud and/or otherwise cause the device cloud to be disconnected (e.g., by sending a disconnection request and/or other information to one or more remote servers and/or devices).

On the other hand, if it is determined in step 725, that at least one policy of the one or more policies has not been violated, then the method may end. Additionally or alternatively, the method may continue in a loop, such that steps 720 and 725 may be periodically repeated (e.g., to reevaluate the state information and/or determine whether one or more policies have been violated). In addition, in instances in which the computing device and/or the MDM agent running on the computing device obtained and/or evaluated state information from one or more other devices participating in the device cloud, similar policy analysis may be performed (e.g., in step 725) using the state information obtained from the other device(s) and similar disconnection actions may be performed (e.g., in step 730) if a policy violation is identified.

Figure 8:
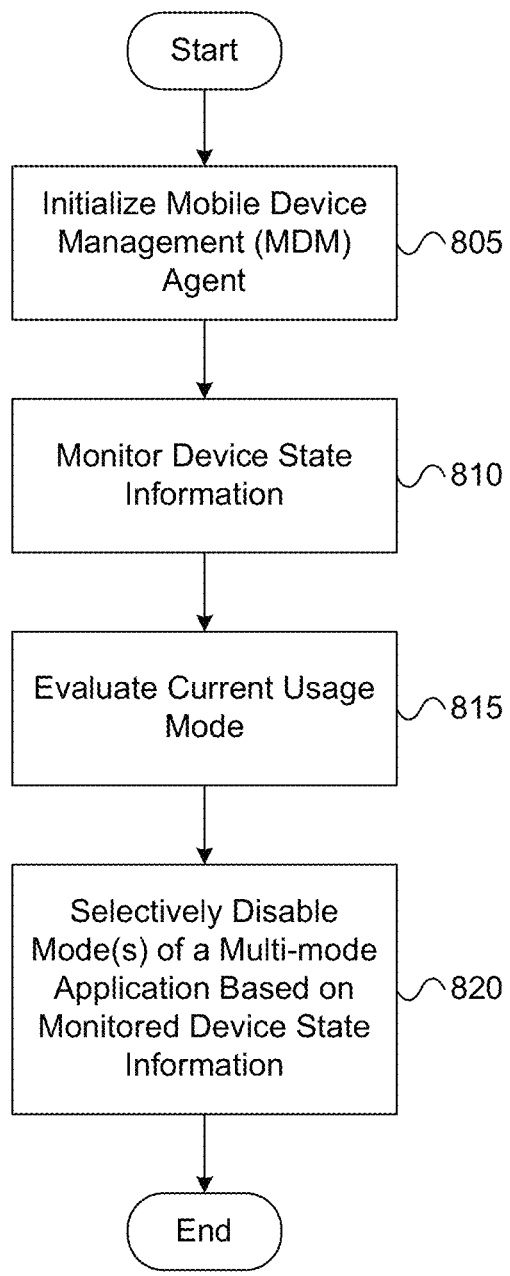
FIG. 8 depicts a flowchart that illustrates a method of selectively disabling one or more modes of a multi-mode application based on one or more mobile device management policies in accordance with one or more illustrative aspects discussed herein.

FIG. 8 depicts a flowchart that illustrates a method of selectively disabling one or more modes of a multi-mode application based on one or more mobile device management policies in accordance with one or more illustrative aspects discussed herein. In one or more embodiments, the method illustrated in FIG. 8 and/or one or more steps thereof may be performed by a computing device (e.g., generic computing device 201). In other embodiments, the method illustrated in FIG. 8 and/or one or more steps thereof may be embodied in computer-executable instructions that are stored in a computer-readable medium, such as a non-transitory computer-readable memory.

As seen in FIG. 8, the method may begin at step 805 in which a mobile device management (MDM) agent may be initialized. For example, in step 805, a computing device (e.g., a mobile computing device, such as a laptop computer, tablet computer, smart phone, or other type of mobile device) may initialize an MDM agent, similar to how such an MDM agent may be initialized in step 505 (discussed above). In one or more arrangements, after an MDM agent is initialized on a computing device (e.g., in step 805), the computing device and/or the MDM agent running on the computing device may provide information to, and/or may receive one or more commands from, one or more policy management servers (which may, e.g., impact the state of the device), similar to how such information may be provided and how such commands may be received in the examples discussed above. For example, after providing at least some of the monitored state information to the one or more policy management servers, the computing device and/or the MDM agent running on the computing device may receive one or more commands from the one or more policy management servers based on the state information that was provided (e.g., as the one or more policy management servers may receive the provided state information, analyze the provided state information in view of one or more mobile device management policies, generate one or more commands based on the provided state information and/or based on the one or more policies, and return the generated commands to the computing device and/or the MDM agent running on the computing device).

In step 810, state information associated with a mobile computing device may be monitored by the mobile device management agent. For example, in step 810, the mobile computing device and/or the MDM agent running on the mobile computing device may collect, maintain, evaluate, analyze, and/or otherwise monitor various types of state information, similar to how such state information may be monitored by the MDM agent and/or the computing device in the examples discussed above (e.g., with respect to step 610 of FIG. 6). For instance, monitoring the state information may, in some embodiments, include identifying one or more applications that are present on the mobile computing device (e.g., as in the examples above). Additionally or alternatively, monitoring the state information may, in some embodiments, include identifying one or more network connections that are used by the mobile computing device. Additionally or alternatively, monitoring the state information may, in some embodiments, include determining current location information for the mobile computing device.

In step 815, a current usage mode of the mobile computing device may be evaluated. For example, in step 815, in evaluating the current usage mode of the mobile computing device, the computing device and/or the MDM agent running on the computing device may determine, based on the monitored state information (e.g., the state information being monitored in step 810), whether the computing device is being used in an enterprise mode. For instance, it may be determined that the computing device is being used in an enterprise mode if the computing device and/or one or more applications running on the computing device are currently accessing, editing, storing, and/or otherwise interacting with enterprise data (e.g., information obtained from one or more enterprise resources), rather than merely interacting with unmanaged data (e.g., non-enterprise data, such as personal data of the user, like personal contacts, notes, etc.).

In some embodiments, in response to determining that the mobile computing device is not being used in an enterprise mode (e.g., in evaluating the current usage mode of the device in step 815), the computing device and/or the MDM agent running on the computing device may determine to selectively disable at least one mode of a multi-mode application (e.g., a dual-mode application, as discussed below). For example, responsive to determining that the computing device is not being used in an enterprise mode, the computing device and/or the MDM agent running on the computing device may determine to selectively disable a managed mode of a dual-mode application (e.g., while allowing the application to run and/or continue to run in an unmanaged mode).

In some embodiments, in evaluating a current usage mode of the mobile computing device (e.g., in step 815), the computing device and/or the mobile device management agent running on the computing device may provide at least some of the monitored state information to one or more policy management servers. The one or more policy management servers may, for instance, be configured to receive such state information, analyze the state information (e.g., in view of one or more mobile device management policies), and provide one or more commands back to the mobile device management agent and/or the computing device based on the analysis of the state information. Additionally or alternatively, after providing at least some of the monitored state information to the one or more policy management servers, the computing device and/or the mobile device management agent running on the computing device may receive management information from the one or more policy management servers. In some instances, the received management information may include one or more commands, which in turn may include information indicating whether the computing device and/or the mobile device management agent running on the computing device should disable one or more modes of a multi-mode application that is being executed on the device or that is configured to be executed on the device, as discussed below. Additionally or alternatively, the management information received from the one or more policy management servers may include one or more policy updates (which, e.g., may specify one or more new and/or updated policies to be used in selectively disabling one or more modes of the multi-mode application and/or may be otherwise applied to the multi-mode application).

In step 820, one or more modes of a multi-mode application may be selectively disabled based on the state information. For example, in step 820, the computing device and/or the MDM agent running on the computing device may selectively disable one or more modes of a multi-mode application. In some instances, the computing device and/or the MDM agent running on the computing device may selectively disable one or more modes of the application and/or cause one or more modes of the application to be disabled based on the evaluation and/or determination(s) made in step 815. Additionally or alternatively, one or more mobile device management policies may define certain circumstances in which a certain mode of the application is to be disabled, and the computing device and/or the MDM agent may detect these circumstances based on the state information and subsequently disable the application mode in accordance with the policies. In some instances in which at least some of the monitored state information is provided to one or more policy management servers, the computing device and/or the MDM agent running on the computing device may, in step 820, selectively disable one or more modes of a multi-mode application based management information received from the one or more policy management servers (which may, e.g., be generated by the one or more policy management servers based on an analysis of the provided state information). In addition, the management information may, for instance, include one or more commands specifying that one or more specific modes of the multi-mode application should be disabled. Additionally or alternatively, the management information may, for instance, include one or more policy updates.

In one or more arrangements, the multi-mode application may be a dual-mode application. For example, the multi-mode application may be a dual-mode application having a managed mode that is configured to provide access to enterprise data, as well as an unmanaged mode that is configured to limit access to non-enterprise data (e.g., and instead provide access only to personal, unmanaged data). In some instances, the computing device and/or the MDM agent running the computing device may selectively disable the managed mode (e.g., in step 820) based on the state information being monitored (e.g., in step 815) by the computing device and/or by the MDM agent running on the computing device. Once the managed mode of the dual-mode application has been disabled, the application may be able to run and/or continue running only in the unmanaged mode (e.g., until the managed mode is enabled by the computing device and/or by the MDM agent running on the computing device).

Additionally or alternatively, the multi-mode application may be a dual-mode application having a first mode that is configured to provide a first level of access to enterprise data and a second mode that is configured to provide a second level of access to enterprise data, where the second level of access is higher than the first level of access. For instance, the multi-mode application may be a dual-mode application that has a "secure" mode and a "super secure" mode, which may be selectively disabled (e.g., in step 820) based on the state information being monitored by the computing device and/or the MDM agent running on the computing device.

Figure 9:
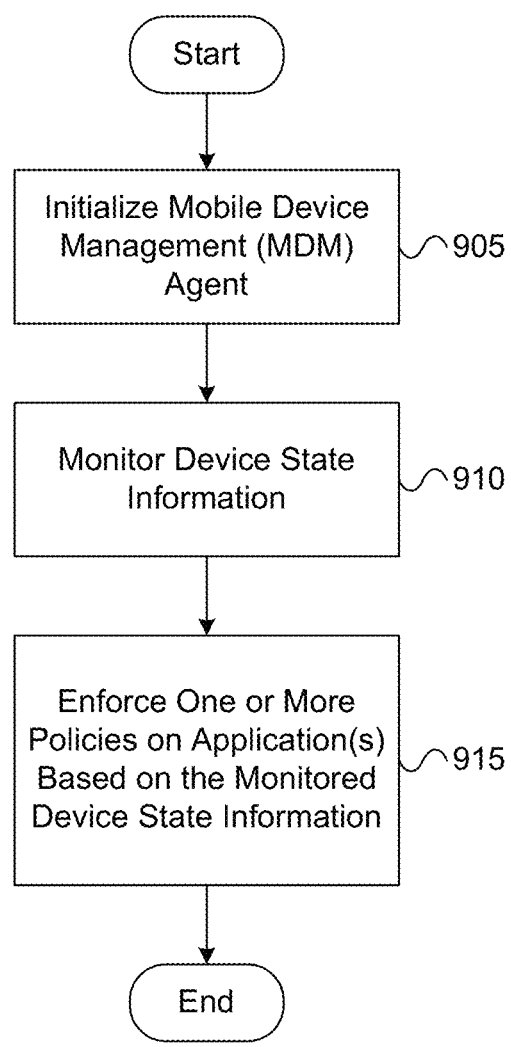
FIG. 9 depicts a flowchart that illustrates a method of enforcing one or more mobile device management policies on one or more applications in accordance with one or more illustrative aspects discussed herein.

FIG. 9 depicts a flowchart that illustrates a method of enforcing one or more mobile device management policies on one or more applications in accordance with one or more illustrative aspects discussed herein. In one or more embodiments, the method illustrated in FIG. 9 and/or one or more steps thereof may be performed by a computing device (e.g., generic computing device 201). In other embodiments, the method illustrated in FIG. 9 and/or one or more steps thereof may be embodied in computer-executable instructions that are stored in a computer-readable medium, such as a non-transitory computer-readable memory.

As seen in FIG. 9, the method may begin at step 905 in which a mobile device management (MDM) agent may be initialized. For example, in step 905, a computing device (e.g., a mobile computing device, such as a laptop computer, tablet computer, smart phone, or other type of mobile device) may initialize an MDM agent, similar to how such an MDM agent may be initialized in step 505 (discussed above). In one or more arrangements, after an MDM agent is initialized on a computing device (e.g., in step 905), the computing device and/or the MDM agent running on the computing device may provide information to, and/or may receive one or more commands from, one or more policy management servers (which may, e.g., impact the state of the device), similar to how such information may be provided and how such commands may be received in the examples discussed above. For example, after providing at least some of the monitored state information to the one or more policy management servers, the computing device and/or the MDM agent running on the computing device may receive one or more commands from the one or more policy management servers based on the state information that was provided (e.g., as the one or more policy management servers may receive the provided state information, analyze the provided state information in view of one or more mobile device management policies, generate one or more commands based on the provided state information and/or based on the one or more policies, and return the generated commands to the computing device and/or the MDM agent running on the computing device).

In step 910, state information associated with a mobile computing device may be monitored by the mobile device management agent. For example, in step 910, the mobile computing device and/or the MDM agent running on the mobile computing device may collect, maintain, evaluate, analyze, and/or otherwise monitor various types of state information, similar to how such state information may be monitored by the MDM agent and/or the computing device in the examples discussed above (e.g., with respect to step 610 of FIG. 6). For instance, monitoring the state information may, in some embodiments, include identifying one or more applications that are present on the mobile computing device (e.g., as in the examples above). Additionally or alternatively, monitoring the state information may, in some embodiments, include identifying one or more network connections that are used by the mobile computing device. Additionally or alternatively, monitoring the state information may, in some embodiments, include determining current location information for the mobile computing device. In one or more arrangements, monitoring the state information may include providing at least some of the monitored state information to one or more policy management servers. For example, in monitoring the state information (e.g., in step 910), the mobile computing device and/or the MDM agent running on the mobile computing device may send at least some of the monitored state information to one or more policy management servers (which may, e.g., be configured to analyze such state information, as discussed above).

In step 915, one or more policies may be enforced on at least one application on the mobile computing device based on the monitored state information. For example, in step 915, the computing device and/or the MDM agent running on the computing device may enforce one or more policies on an application on the device based on the state information being monitored (e.g., in step 910). The one or more mobile device management policies may define certain circumstances in which certain functionalities of certain applications are to be enabled, disabled, and/or modified, and the computing device and/or the MDM agent may detect these circumstances based on the state information and subsequently enable, disable, and/or modify these functionalities in accordance with the policies.

In one or more arrangements, enforcing the one or more policies on the at least one application may include receiving management information from the one or more policy management servers and executing at least one command included in the management information. For example, in enforcing the one or more policies on the at least one application (e.g., in step 915), the mobile computing device and/or the MDM agent running on the mobile computing device may receive management information that includes one or more commands from the one or more policy management servers (which may, e.g., have been generated by the one or more policy management servers based on the device state information provided to and received by them in step 910). Additionally or alternatively, after receiving such commands from the one or more policy management servers, the mobile computing device and/or the MDM agent running on the mobile computing device may execute one or more of the received commands in order to enforce one or more policies and/or otherwise impose one or more restrictions on the application(s) being subjected to the policies. For example, the one or more commands received from the one or more policy management servers may specify that specific functions of the application (e.g., cut-and-paste functions, save functions, etc.) should be selectively disabled (e.g., in view of the current circumstances reflected by the device state information). In some instances, the management information may additionally or alternatively include one or more policy updates, which may, for instance, include new and/or updated policies to be applied to the at least one application.

In some instances, the application (e.g., the application on which the policies are enforced in step 915) may be a wrapped application (which may, e.g., be wrapped using an application management framework, such as application management framework 414 discussed above). In enforcing policies on such a wrapped application, the MDM agent running on the computing device may communicate with the application wrapper and/or the application management framework to selectively enable and/or disable certain functions of the application and/or make configuration changes to the application and/or the application wrapper.

In some embodiments, enforcing the one or more policies may include disabling the at least one application based on the monitored state information. For example, in step 915, the computing device and/or the MDM agent running on the computing device may selectively disable one or more functions of the application (e.g., a save data function, a remote access function, etc.) based on the state information (e.g., monitored in step 910).

In some embodiments, enforcing the one or more policies may include reconfiguring the at least one application. For example, in step 915, the computing device and/or the MDM agent running on the computing device may reconfigure the application based on the state information (e.g., by connecting the application to a different backend or cloud, for instance, based on status and/or nature of the device's current network connection).

Figure 10:
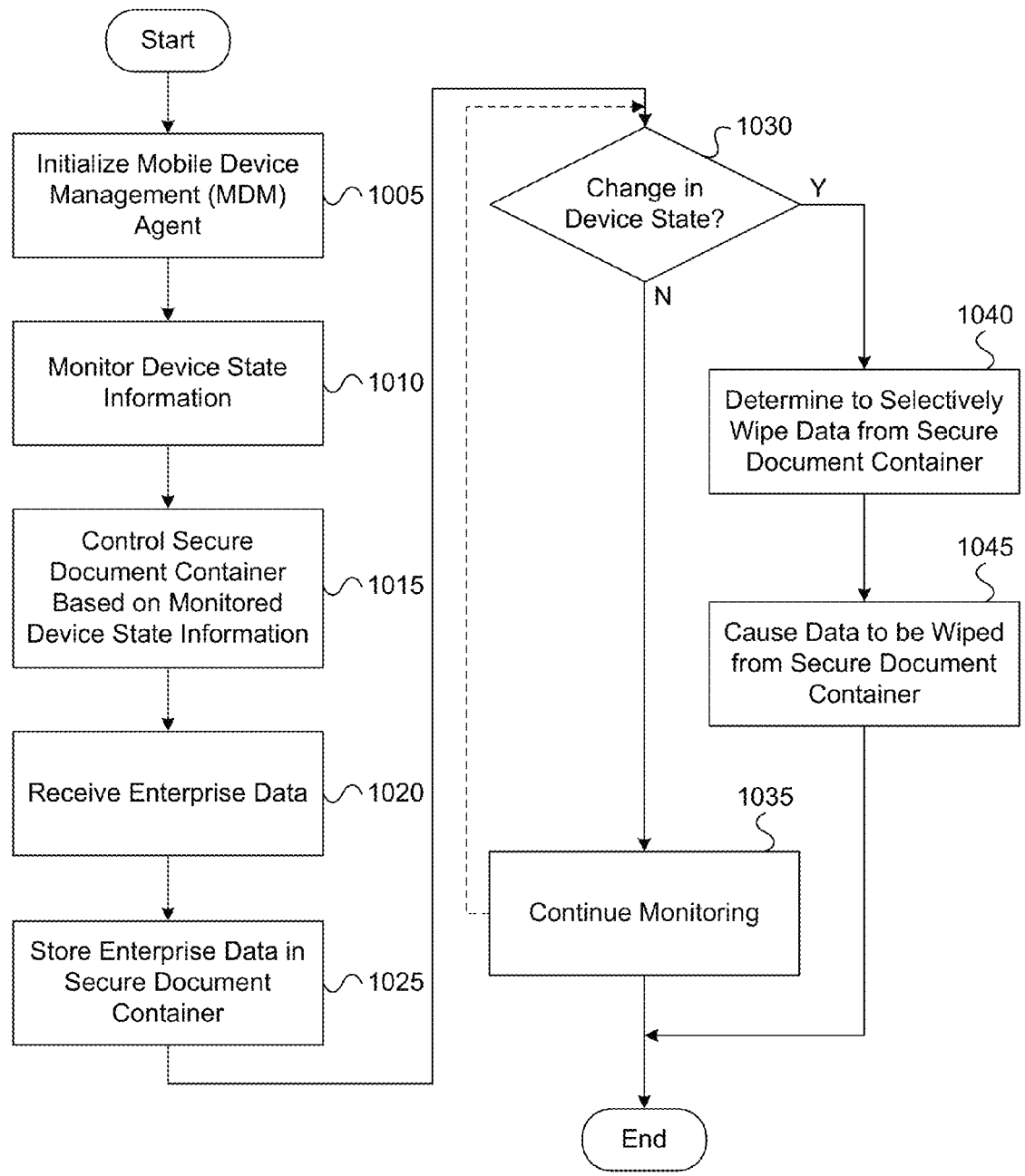
FIG. 10 depicts a flowchart that illustrates a method of controlling a secure document container based on device state information in accordance with one or more illustrative aspects discussed herein.

FIG. 10 depicts a flowchart that illustrates a method of controlling a secure document container based on device state information in accordance with one or more illustrative aspects discussed herein. In one or more embodiments, the method illustrated in FIG. 10 and/or one or more steps thereof may be performed by a computing device (e.g., generic computing device 201). In other embodiments, the method illustrated in FIG. 10 and/or one or more steps thereof may be embodied in computer-executable instructions that are stored in a computer-readable medium, such as a non-transitory computer-readable memory.

As seen in FIG. 10, the method may begin at step 1005, in which a mobile device management (MDM) agent may be initialized. For example, in step 1005, a computing device (e.g., a mobile computing device, such as a laptop computer, tablet computer, smart phone, or other type of mobile device) may initialize an MDM agent, similar to how such an MDM agent may be initialized in step 505 (discussed above). In one or more arrangements, after an MDM agent is initialized on a computing device (e.g., in step 1005), the computing device and/or the MDM agent running on the computing device may provide information to, and/or may receive one or more commands from, one or more policy management servers (which may, e.g., impact the state of the device), similar to how such information may be provided and how such commands may be received in the examples discussed above. For example, after providing at least some of the monitored state information to the one or more policy management servers, the computing device and/or the MDM agent running on the computing device may receive one or more commands from the one or more policy management servers based on the state information that was provided (e.g., as the one or more policy management servers may receive the provided state information, analyze the provided state information in view of one or more mobile device management policies, generate one or more commands based on the provided state information and/or based on the one or more policies, and return the generated commands to the computing device and/or the MDM agent running on the computing device).

In step 1010, state information associated with a mobile computing device may be monitored by the mobile device management agent. For example, in step 1010, the mobile computing device and/or the MDM agent running on the mobile computing device may collect, maintain, evaluate, analyze, and/or otherwise monitor various types of state information, similar to how such state information may be monitored by the MDM agent and/or the computing device in the examples discussed above (e.g., with respect to step 610 of FIG. 6). For instance, monitoring the state information may, in some embodiments, include identifying one or more applications that are present on the mobile computing device (e.g., as in the examples above). Additionally or alternatively, monitoring the state information may, in some embodiments, include identifying one or more network connections that are used by the mobile computing device. Additionally or alternatively, monitoring the state information may, in some embodiments, include determining current location information for the mobile computing device. In one or more arrangements, monitoring the state information may include providing at least some of the monitored state information to one or more policy management servers. For example, in monitoring the state information (e.g., in step 1010), the mobile computing device and/or the MDM agent running on the mobile computing device may send at least some of the monitored state information to one or more policy management servers (which may, e.g., be configured to analyze such state information, as discussed above).

In step 1015, a secure document container may be controlled based on the monitored state information. For example, in step 1015, the computing device and/or the MDM agent running on the computing device may control a secure document container based on the state information being monitored (e.g., in step 1010). In one or more arrangements, the secure document container may be a data repository on the computing device that is configured to securely store enterprise data received by the mobile computing device from one or more enterprise resources. Additionally or alternatively, one or more mobile device management policies may define certain circumstances in which access to the secure document container is to be restricted, modified, and/or otherwise controlled, and the computing device and/or the MDM agent may detect these circumstances based on the state information and subsequently restrict, modify, and/or otherwise control access to the secure document container in accordance with the policies. In other instances, other aspects of the secure document container (e.g., other than access to the secure document container) may be similarly controlled by one or more mobile device management policies.

In one or more arrangements, controlling the secure document container may include receiving management information from the one or more policy management servers and executing at least one command included in the management information. For example, in controlling the secure document container (e.g., in step 1015), the mobile computing device and/or the MDM agent running on the mobile computing device may receive management information that includes one or more commands from the one or more policy management servers (which may, e.g., have been generated by the one or more policy management servers based on the device state information provided to and received by them in step 1010). Additionally or alternatively, after receiving such commands from the one or more policy management servers, the mobile computing device and/or the MDM agent running on the mobile computing device may execute one or more of the received commands in order to enforce one or more policies and/or otherwise impose one or more restrictions on the secure document container. For example, the one or more commands received from the one or more policy management servers may specify that specific types of data can or cannot be accessed, stored, modified, and/or otherwise interacted with in the secure document container (e.g., in view of the current circumstances reflected by the device state information). In some instances, the management information may additionally or alternatively include one or more policy updates, which may, for instance, include new and/or updated policies to be applied to the at least one application.

In some embodiments, controlling the secure document container may include controlling access to data stored in the secure document container based on the monitored state information. For example, in controlling the secure document container, the computing device and/or the MDM agent running on the computing device may control access to data stored in the secure document container based on the state information being monitored (e.g., in step 1010).

In some embodiments, controlling the secure document container may include selectively wiping data from the secure document container based on the monitored state information. For example, in controlling the secure document container, the computing device and/or the MDM agent running on the computing device may selectively wipe data from the secure document container based on the state information being monitored (e.g., in step 1010). In some instances, selectively wiping data from the secure document container may include deleting managed and/or enterprise data from the secure document container, while leaving (and not deleting) unmanaged and/or non-enterprise data in the secure document container. In other instances, different types of data may be deleted from the secure document container (e.g., based on one or more mobile device management policies) while other types of data are left in the secure document container. In some instances, selectively wiping data from the secure document container may be based on one or more mobile device management policies and/or based on a change in device state (which may, e.g., implicate various policies and/or invoke various policy-based responses to the change in device state), as illustrated in the examples discussed below.

In step 1020, enterprise data may be received. For example, in step 1020, the computing device and/or the MDM agent running on the computing device may receive enterprise data (e.g., from one or more enterprise resources, such as one or more enterprise databases and/or servers).

In step 1025, the received enterprise data may be stored in the secure document container. For example, in step 1025, the computing device and/or the MDM agent running on the computing device may store the enterprise data (which may, e.g., have been received in step 1020) in the secure document container.

In step 1030, it may be determined whether a change in device state has been detected based on the monitored state information. For example, in step 1030, the computing device and/or the MDM agent running on the computing device may determine, based on the state information being monitored (e.g., in step 1030), whether a change in device state has been detected. In determining whether a change in device state has been detected, the computing device and/or the MDM agent running on the computing device may, for instance, determine whether a new application has been installed on and/or otherwise added to the computing device, whether an application has been deleted from the computing device, whether the network connection being used by the computing device has changed, and/or whether the location in which the computing device is being used has changed. While these examples illustrate the types of changes in state information that may be detected in some instances, additional and/or alternative types of changes in state information may similarly be detected in other instances.

If it is determined, in step 1030, that a change in device state has not been detected, then in step 1035, monitoring of the state information may continue. For example, in step 1035, the computing device and/or the MDM agent running on the computing device may continue monitoring state information (e.g., similar to how state information may be monitored in step 1010. Subsequently, the method may end. Alternatively, the method may continue in a loop and return to step 1030 in which the computing device and/or the MDM agent running on the computing device may periodically reevaluate whether a change in device state has been detected.

On the other hand, if it is determined in step 1030, that a change in device state has been detected, then in step 1040, the computing device and/or the MDM agent running on the computing device may determine to selectively wipe data from the secure document container. In some instances, the change in device state may be detected by one or more policy management servers (e.g., based on device state information provided to such servers by the MDM agent), and it may be determined, in step 1040, to selectively wipe data from the secure document container based on one or more commands received from the policy management servers (which may, e.g., be configured to analyze the device state information and subsequently generate such commands based on such analysis). Subsequently, in step 1045, the computing device and/or the MDM agent running on the computing device may wipe data from secure document container and/or cause data to be wiped from the secure document container. In some instances, the computing device and/or the MDM agent may wipe enterprise data from the secure document container (e.g., the enterprise data received in step 1020 and stored in the secure document container in step 1025) while leaving other data (e.g., not deleting the other data) in the secure document container. In other instances, the computing device and/or the MDM agent may wipe data from the secure document container that was received and/or stored during a certain time period (e.g., within the last four hours) while leaving other data (e.g., data that was received and/or stored during a different time period). In still other instances, the computing device and/or the MDM agent may wipe data from the secure document container that was received and/or stored in connection with a certain application (e.g., a web browser) while leaving other data (which may, e.g., be associated with other applications, such as word processing applications, spreadsheet applications, etc.).

In one or more arrangements, the data that is wiped (e.g., in step 1045) may be deleted (e.g., by the computing device and/or by the MDM agent running on the computing device) in accordance with one or more mobile device management policies. For example, one or more mobile device management policies may define certain circumstances in which certain type(s) of data are to be selectively wiped from the secure document container, and the computing device and/or the MDM agent running on the computing device may detect these circumstances based on the state information and subsequently wipe data from the secure document container in accordance with the policies.

Figure 11:
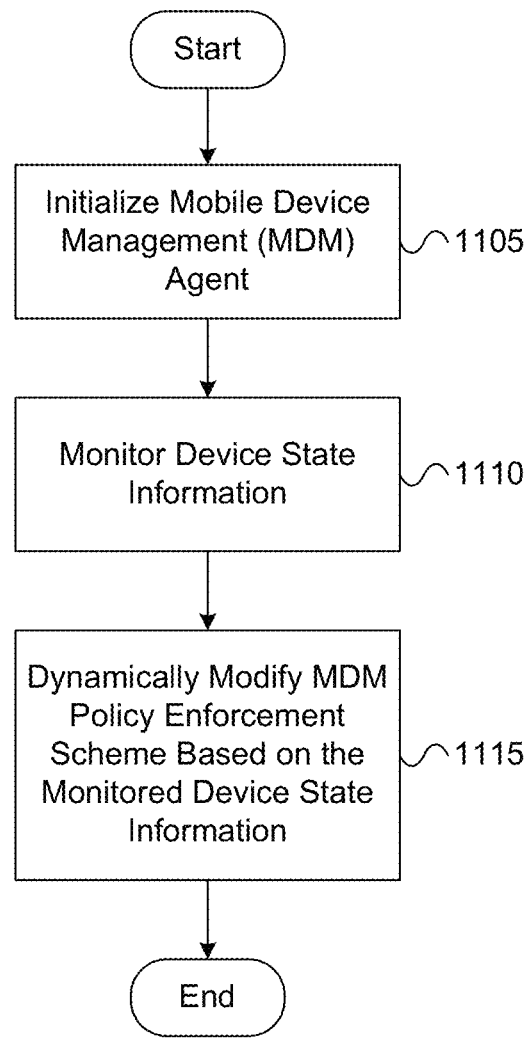
FIG. 11 depicts a flowchart that illustrates a method of dynamically modifying a mobile device management policy enforcement scheme based on device state information in accordance with one or more illustrative aspects discussed herein.

FIG. 11 depicts a flowchart that illustrates a method of dynamically modifying a mobile device management policy enforcement scheme based on device state information in accordance with one or more illustrative aspects discussed herein. In one or more embodiments, the method illustrated in FIG. 11 and/or one or more steps thereof may be performed by a computing device (e.g., generic computing device 201). In other embodiments, the method illustrated in FIG. 11 and/or one or more steps thereof may be embodied in computer-executable instructions that are stored in a computer-readable medium, such as a non-transitory computer-readable memory.

As seen in FIG. 11, the method may begin at step 1105, in which a mobile device management (MDM) agent may be initialized. For example, in step 1105, a computing device (e.g., a mobile computing device, such as a laptop computer, tablet computer, smart phone, or other type of mobile device) may initialize an MDM agent, similar to how such an MDM agent may be initialized in step 505 (discussed above). In one or more arrangements, after an MDM agent is initialized on a computing device (e.g., in step 1105), the computing device and/or the MDM agent running on the computing device may provide information to, and/or may receive one or more commands from, one or more policy management servers (which may, e.g., impact the state of the device), similar to how such information may be provided and how such commands may be received in the examples discussed above. For example, after providing at least some of the monitored state information to the one or more policy management servers, the computing device and/or the MDM agent running on the computing device may receive one or more commands from the one or more policy management servers based on the state information that was provided (e.g., as the one or more policy management servers may receive the provided state information, analyze the provided state information in view of one or more mobile device management policies, generate one or more commands based on the provided state information and/or based on the one or more policies, and return the generated commands to the computing device and/or the MDM agent running on the computing device).

In step 1110, state information associated with a mobile computing device may be monitored by the mobile device management agent. For example, in step 1110, the mobile computing device and/or the MDM agent running on the mobile computing device may collect, maintain, evaluate, analyze, and/or otherwise monitor various types of state information, similar to how such state information may be monitored by the MDM agent and/or the computing device in the examples discussed above (e.g., with respect to step 610 of FIG. 6). For instance, monitoring the state information may, in some embodiments, include identifying one or more applications that are present on the mobile computing device (e.g., as in the examples above). Additionally or alternatively, monitoring the state information may, in some embodiments, include identifying one or more network connections that are used by the mobile computing device. Additionally or alternatively, monitoring the state information may, in some embodiments, include determining current location information for the mobile computing device.

In step 1115, a mobile device management policy enforcement scheme may be dynamically modified based on the monitored state information. For example, in step 1115, the computing device and/or the MDM agent running on the computing device may dynamically modify a mobile device management policy enforcement scheme based on the state information (e.g., monitored in step 1110). In one or more arrangements, the computing device and/or the MDM agent running on the computing device may implement and/or otherwise have a mobile device management policy enforcement scheme that defines what policies are active (e.g., mobile device management policies that are defined and currently should be enforced), what policies are inactive (e.g., mobile device management policies that are defined but currently should not be enforced), and/or other factors and information related to the definition and/or enforcement of mobile device management policies. By dynamically modifying the mobile device management policy enforcement scheme based on the state information, the computing device and/or the MDM agent running on the computing device may dynamically vary the policies that are being enforced and/or other aspects of the policy enforcement scheme based on current device-level considerations (e.g., as reflected in the state information being monitored by the computing device and/or by the MDM agent).

In some embodiments, dynamically modifying the mobile device management policy enforcement scheme may include activating one or more inactive policies based on the monitored state information. For example, in dynamically modifying the mobile device management policy enforcement scheme, the computing device and/or the MDM agent running on the computing device may activate one or more inactive policies based on the state information being monitored by the computing device and/or by the MDM agent. In activating one or more inactive policies, the computing device and/or the MDM agent may set and/or modify one or more flags corresponding to the inactive policies to initiate enforcement of the inactive policies and/or may begin enforcing these policies. In this way, a change in state information (which may, e.g., correspond to a change in the applications that are present on the device, a change in the network connection(s) being used by the device, and/or a change in location of the device) may result in a change in the policy enforcement scheme (which may, e.g., include the activation of one or more inactive policies).

In some embodiments, dynamically modifying the mobile device management policy enforcement scheme may include deactivating one or more active policies based on the monitored state information. For example, in dynamically modifying the mobile device management policy enforcement scheme, the computing device and/or the MDM agent running on the computing device may deactivate one or more active policies based on the state information being monitored by the computing device and/or by the MDM agent. In deactivating one or more active policies, the computing device and/or the MDM agent may set and/or modify one or more flags corresponding to active policies to cease enforcement of the active policies and/or may stop enforcing these policies. In this way, a change in state information (which may, e.g., correspond to a change in the applications that are present on the device, a change in the network connection(s) being used by the device, and/or a change in the location of the device) may result in a change in the policy enforcement scheme (which may, e.g., include the deactivation of one or more active policies).

In some embodiments, dynamically modifying the mobile device management policy enforcement scheme may include updating one or more parameters associated with at least one active policy based on the monitored state information. For example, in dynamically modifying the mobile device management policy enforcement scheme, the computing device and/or the MDM agent running on the computing device may update one or more parameters of an active policy based on the state information being monitored by the computing device and/or by the MDM agent. In updating one or more parameters of an active policy, the computing device and/or the MDM agent may set and/or modify one or more values and/or other settings that are used by the policy (e.g., in defining circumstances in which the policy is applicable and/or invoked, in defining response actions and/or modes in different circumstances, etc.) and/or may begin and/or continue enforcing the updated policy. In this way, a change in state information (which may, e.g., correspond to a change in the applications that are present on the device, a change in the network connection(s) being used by the device, and/or a change in the location of the device) may result in a change in the policy enforcement scheme (which may, e.g., include updating the parameters of a policy).

Figure 12:
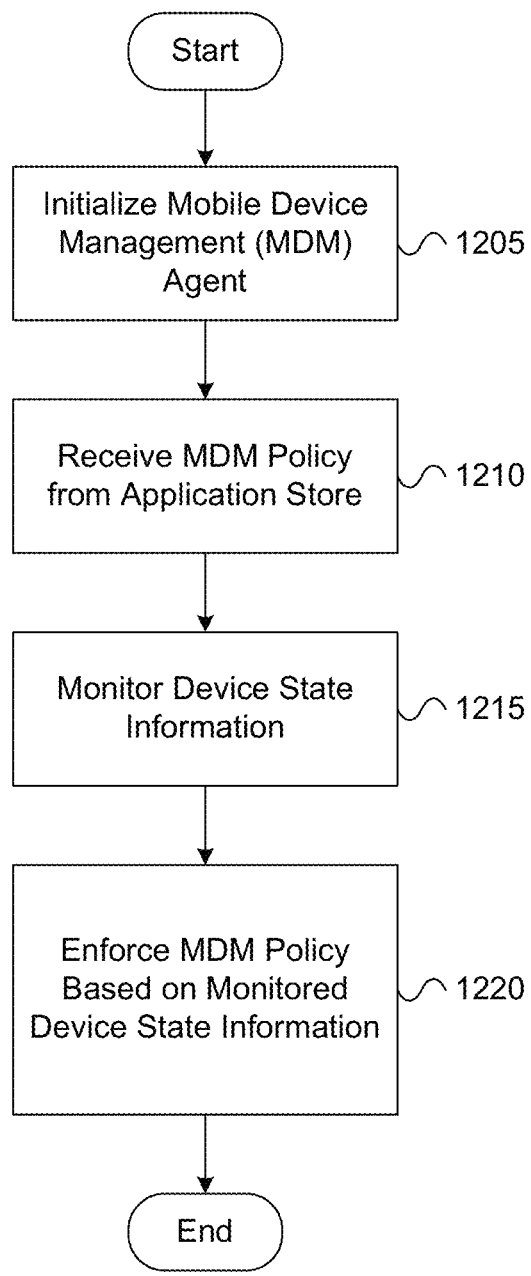
FIG. 12 depicts a flowchart that illustrates a method of enforcing mobile device management policies that are received from an application store in accordance with one or more illustrative aspects discussed herein.

FIG. 12 depicts a flowchart that illustrates a method of enforcing mobile device management policies that are received from an application store in accordance with one or more illustrative aspects discussed herein. In one or more embodiments, the method illustrated in FIG. 12 and/or one or more steps thereof may be performed by a computing device (e.g., generic computing device 201). In other embodiments, the method illustrated in FIG. 12 and/or one or more steps thereof may be embodied in computer-executable instructions that are stored in a computer-readable medium, such as a non-transitory computer-readable memory.

As seen in FIG. 12, the method may begin at step 1205, in which a mobile device management (MDM) agent may be initialized. For example, in step 1205, a computing device (e.g., a mobile computing device, such as a laptop computer, tablet computer, smart phone, or other type of mobile device) may initialize an MDM agent, similar to how such an MDM agent may be initialized in step 505 (discussed above). In one or more arrangements, after an MDM agent is initialized on a computing device (e.g., in step 1205), the computing device and/or the MDM agent running on the computing device may provide information to, and/or may receive one or more commands from, one or more policy management servers (which may, e.g., impact the state of the device), similar to how such information may be provided and how such commands may be received in the examples discussed above. For example, after providing at least some of the monitored state information to the one or more policy management servers, the computing device and/or the MDM agent running on the computing device may receive one or more commands from the one or more policy management servers based on the state information that was provided (e.g., as the one or more policy management servers may receive the provided state information, analyze the provided state information in view of one or more mobile device management policies, generate one or more commands based on the provided state information and/or based on the one or more policies, and return the generated commands to the computing device and/or the MDM agent running on the computing device).

In step 1210, at least one mobile device management policy may be received from an application store. For example, in step 1210, the mobile computing device and/or the MDM agent running on the computing device may receive a mobile device management policy from an application store. In some instances, the application store (e.g., from which the policy is received) may be an enterprise application store that is configured to provide enterprise applications to one or more mobile computing devices. In addition to being configured to provide enterprise applications to various devices, the enterprise application store also may be configured to provide one or more mobile device management policies and/or policy updates to various devices.

In step 1215, state information associated with the mobile computing device may be monitored via the mobile device management agent. For example, in step 1215, the mobile computing device and/or the MDM agent running on the mobile computing device may collect, maintain, evaluate, analyze, and/or otherwise monitor various types of state information, similar to how such state information may be monitored by the MDM agent and/or the computing device in the examples discussed above (e.g., with respect to step 610 of FIG. 6). For instance, monitoring the state information may, in some embodiments, include identifying one or more applications that are present on the mobile computing device (e.g., as in the examples above). Additionally or alternatively, monitoring the state information may, in some embodiments, include identifying one or more network connections that are used by the mobile computing device. Additionally or alternatively, monitoring the state information may, in some embodiments, include determining current location information for the mobile computing device.

In step 1220, the at least one mobile device management policy may be enforced based on the monitored state information. For example, in step 1220, the mobile computing device and/or the MDM agent running on the computing device may enforce the policy that was received from the application store (e.g., in step 1210) based on the state information being monitored in step 1215. The mobile device management policy received from the application store (which may, e.g., be an enterprise application store) may, for instance, define one or more circumstances in which certain functions and/or applications are to be controlled, and the computing device and/or the MDM agent may detect these circumstances based on the state information and subsequently control these functions and/or applications in enforcing the policy.

In some embodiments, enforcing the at least one mobile device management policy may include selectively disabling one or more functions of the mobile computing device based on the monitored state information. For example, in enforcing the mobile device management policy received from the application store, the computing device and/or the MDM agent running on the computing device may selectively disable one or more functions of the computing device based on the monitored state information. For instance, the computing device and/or the MDM agent running on the computing device may selectively disable a camera function of the computing device, a local wireless sharing function of the computing device, and/or other functions of the computing device in accordance based on current circumstances (e.g., as reflected by the state information) and the policy being applied and enforced.

In some embodiments, enforcing the at least one mobile device management policy may include selectively disabling one or more applications based on the monitored state information. For example, in enforcing the mobile device management policy received from the application store, the computing device and/or the MDM agent running on the computing device may selectively disable one or more applications on the computing device based on the monitored state information. In disabling an application, the computing device and/or the MDM agent may, for instance, prevent the application from being opened or otherwise executed and may close the application if it is currently running. In some instances, the one or more applications that are disabled by the computing device and/or the MDM agent may include enterprise applications that were downloaded and/or otherwise obtained from the enterprise application store (e.g., from which the policy was received).

Figure 13:
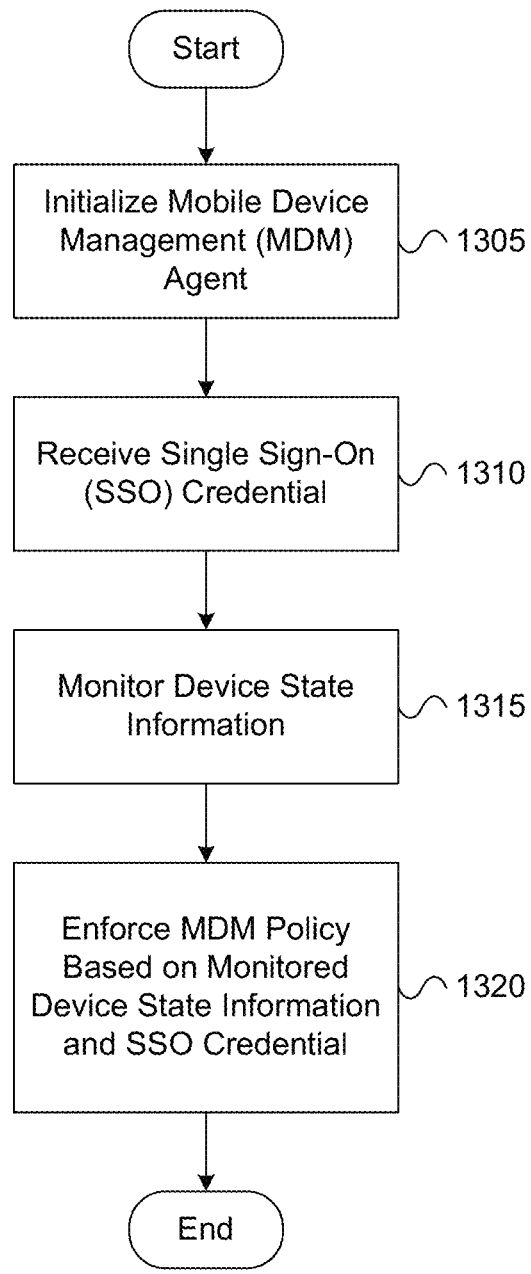
FIG. 13 depicts a flowchart that illustrates a method of enforcing mobile device management policies based on a single sign-on credential in accordance with one or more illustrative aspects discussed herein.

FIG. 13 depicts a flowchart that illustrates a method of enforcing mobile device management policies based on a single sign-on credential in accordance with one or more illustrative aspects discussed herein. In one or more embodiments, the method illustrated in FIG. 13 and/or one or more steps thereof may be performed by a computing device (e.g., generic computing device 201). In other embodiments, the method illustrated in FIG. 13 and/or one or more steps thereof may be embodied in computer-executable instructions that are stored in a computer-readable medium, such as a non-transitory computer-readable memory As seen in FIG. 13, the method may begin at step 1305, in which a mobile device management (MDM) agent may be initialized. For example, in step 1305, a computing device (e.g., a mobile computing device, such as a laptop computer, tablet computer, smart phone, or other type of mobile device) may initialize an MDM agent, similar to how such an MDM agent may be initialized in step 505 (discussed above). In one or more arrangements, after an MDM agent is initialized on a computing device (e.g., in step 1305), the computing device and/or the MDM agent running on the computing device may provide information to, and/or may receive one or more commands from, one or more policy management servers (which may, e.g., impact the state of the device), similar to how such information may be provided and how such commands may be received in the examples discussed above. For example, after providing at least some of the monitored state information to the one or more policy management servers, the computing device and/or the MDM agent running on the computing device may receive one or more commands from the one or more policy management servers based on the state information that was provided (e.g., as the one or more policy management servers may receive the provided state information, analyze the provided state information in view of one or more mobile device management policies, generate one or more commands based on the provided state information and/or based on the one or more policies, and return the generated commands to the computing device and/or the MDM agent running on the computing device).

In step 1310, a single sign-on (SSO) credential that is associated with at least one user account may be received. For example, in step 1310, the computing device and/or the MDM agent running on the computing device may receive a single sign-on credential, and the single sign-on credential may be linked to and/or otherwise associated with a particular user of the computing device and/or a particular user account (which may, e.g., be utilized in accessing and/or using the computing device and/or other resources, such as enterprise resources and/or other network resources). In one or more arrangements, the single sign-on credential may be an authentication credential that is configured to be used in accessing at least two different enterprise resources (e.g., various enterprise websites, databases, servers, other resources, etc.). Additionally or alternatively, the single sign-on credential may be received when the user is logging into a user account on the computing device, logging into an application on the computing device, logging into a website being accessed via the computing device, interacting with an authentication prompt presented on the computing device, and/or in other ways.

In step 1315, state information associated with the mobile computing device may be monitored via the mobile device management agent. For example, in step 1315, the mobile computing device and/or the MDM agent running on the mobile computing device may collect, maintain, evaluate, analyze, and/or otherwise monitor various types of state information, similar to how such state information may be monitored by the MDM agent and/or the computing device in the examples discussed above (e.g., with respect to step 610 of FIG. 6). For instance, monitoring the state information may, in some embodiments, include identifying one or more applications that are present on the mobile computing device (e.g., as in the examples above). Additionally or alternatively, monitoring the state information may, in some embodiments, include identifying one or more network connections that are used by the mobile computing device. Additionally or alternatively, monitoring the state information may, in some embodiments, include determining current location information for the mobile computing device. In one or more arrangements, monitoring the state information may include providing at least some of the monitored state information to one or more policy management servers. For example, in monitoring the state information (e.g., in step 1315), the mobile computing device and/or the MDM agent running on the mobile computing device may send at least some of the monitored state information to one or more policy management servers (which may, e.g., be configured to analyze such state information, as discussed above). In some instances, in addition to sending at least some of the monitored state information to the one or more policy management servers, the computing device and/or the MDM agent running on the computing device also may send the SSO credential and/or user information derived from the SSO credential to the one or more policy management servers.

In step 1320, at least one mobile device management policy may be enforced based on the monitored state information and the SSO credential. For example, in step 1320, the mobile computing device and/or the MDM agent running on the mobile computing device may enforce one or more mobile device management policies based on the SSO credential received in step 1310 and on the state information monitored in step 1315. In particular, some mobile device management policies may, for instance, define certain circumstances in which certain functions and/or applications are to be controlled for certain users and/or user accounts, and the computing device and/or the MDM agent may detect these circumstances based on the state information and subsequently control these functions and/or applications for the relevant users and/or user accounts based on the monitored state information and based on identity information for the current user and/or current user account (which may, e.g., be determined based on the SSO credential). In this way, different mobile device management policies and/or different sets of mobile device management policies may be selected and/or enforced for different users and/or user accounts, and the SSO credential (e.g., received in step 1310) may be used in determining the appropriate policies and/or sets of policies to be applied and/or enforced.

In one or more arrangements, enforcing the at least one mobile device management policy may include receiving management information from the one or more policy management servers and executing at least one command included in the management information. For example, in enforcing the at least one mobile device management policy (e.g., in step 1320), the mobile computing device and/or the MDM agent running on the mobile computing device may receive management information that includes one or more commands from the one or more policy management servers (which may, e.g., have been generated by the one or more policy management servers based on the device state information provided to and received by them in step 1315). Additionally or alternatively, after receiving such commands from the one or more policy management servers, the mobile computing device and/or the MDM agent running on the mobile computing device may execute one or more of the received commands in order to enforce the at least one mobile device management policy. In instances in which the computing device and/or the MDM agent running on the computing device provided the SSO credential and/or user information derived from the SSO credential to the one or more policy management servers (e.g., in addition to providing the device state information to such servers), the one or more policy management servers may generate the one or more commands not only based on the device state information and one or more policies, but also based on the SSO credential and/or user information derived from the SSO credential. For example, one or more of the commands may be generated by the one or more policy management servers specifically for the particular user, as illustrated in some of the examples discussed below. In some instances, the management information may additionally or alternatively include one or more policy updates, which may, for instance, include new and/or updated policies to be applied to the at least one application.

In some embodiments, enforcing the at least one mobile device management policy may include determining, based on the SSO credential, that a first set of mobile device management policies is applicable, and subsequently enforcing the first set of mobile device management policies based on the monitored state information. For example, in enforcing one or more policies, the computing device and/or the MDM agent running on the computing device may initially determine that a set of policies is applicable based on the identity of the current user and/or user account, as determined based on the previously received single sign-on credential. Subsequently, the computing device and/or the MDM agent may enforce the applicable policies based on the monitored state information, similar to how such policies may be enforced in the examples discussed above. For example, a single user may have multiple user accounts that are linked to one single sign-on credential. For instance, a physician who practices at multiple hospitals and offices may have a user account for each hospital and office where she practices, and all of these different accounts may be linked to one single sign-on credential that corresponds to and can be used by the physician. In accordance with one or more aspects of the disclosure, the physician in this example may use the same single sign-on credential to log in to computer systems at the different hospitals and offices where she practices, and depending on the current location of the device and the SSO credential that is provided during user authentication, one or more different policies and/or different sets of policies may be applied to various applications, processes, and/or other functions of the physician's computing device (which may, e.g., thereby offer the physician access to different resources for the hospital at which she is currently practicing).

In some embodiments, enforcing the at least one mobile device management policy may include obtaining, based on the SSO credential, a first set of mobile device management policies, and enforcing the first set of mobile device management policies based on the monitored state information. For example, in enforcing one or more policies, the computing device and/or the MDM agent running on the computing device may initially obtain a set of mobile device management policies based on the single sign-on credential itself and/or based on the identity of the current user and/or user account, as determined based on the single sign-on credential. In some instances, the set of mobile device management policies may, for instance, be obtained from a policy server, an application store (e.g., an enterprise application store), and/or one or more other sources. Subsequently, the computing device and/or the MDM agent running on the computing device may enforce the obtained policies based on the monitored state information, similar to how such policies may be enforced in the examples discussed above.

In some embodiments, enforcing the at least one mobile device management policy may include selectively disabling at least one of an application and a function of the mobile computing device. For example, in enforcing one or more policies, the computing device and/or the MDM agent running on the computing device may selectively disable one or more applications and/or one or more functions of the computing device based on the state information being monitored by the computing device and/or the MDM agent, similar to how such application(s) and/or function(s) may be selectively disabled and/or otherwise controlled in the examples discussed above.

Figure 14:
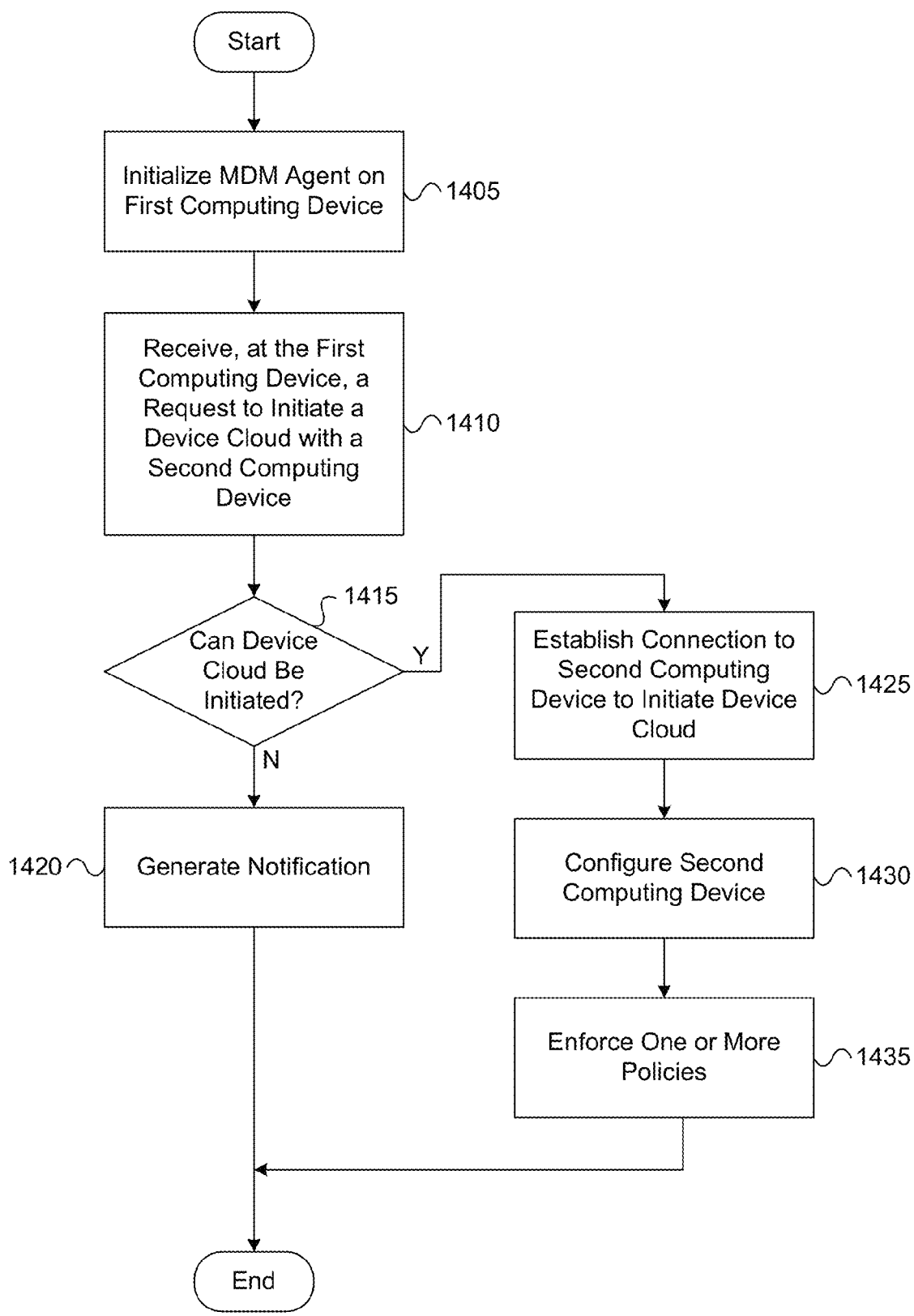
FIG. 14 depicts a flowchart that illustrates another method of applying one or more mobile device management policies to a device cloud in accordance with one or more illustrative aspects discussed herein.

FIG. 14 depicts a flowchart that illustrates another method of applying one or more mobile device management policies to a device cloud in accordance with one or more illustrative aspects discussed herein. In one or more embodiments, the method illustrated in FIG. 14 and/or one or more steps thereof may be performed by a computing device (e.g., generic computing device 201). In other embodiments, the method illustrated in FIG. 14 and/or one or more steps thereof may be embodied in computer-executable instructions that are stored in a computer-readable medium, such as a non-transitory computer-readable memory.

As seen in FIG. 14, the method may begin at step 1405 in which a mobile device management (MDM) agent may be initialized on a first computing device. For example, in step 1405, a computing device (e.g., a mobile computing device, such as a laptop computer, tablet computer, smart phone, or other type of mobile device) may initialize an MDM agent, similar to how such an MDM agent may be initialized in step 505 (discussed above). In one or more arrangements, after an MDM agent is initialized on a computing device (e.g., in step 1405), the computing device and/or the MDM agent running on the computing device may provide information to, and/or may receive one or more commands from, one or more policy management servers (which may, e.g., impact the state of the device), similar to how such information may be provided and how such commands may be received in the examples discussed above. For example, after providing at least some of the monitored state information to the one or more policy management servers, the computing device and/or the MDM agent running on the computing device may receive one or more commands from the one or more policy management servers based on the state information that was provided (e.g., as the one or more policy management servers may receive the provided state information, analyze the provided state information in view of one or more mobile device management policies, generate one or more commands based on the provided state information and/or based on the one or more policies, and return the generated commands to the computing device and/or the MDM agent running on the computing device).

In step 1410, a request may be received by the first computing device to initiate a device cloud with a second computing device. In some instances, the first computing device may, for example, receive a request from a user of the first computing device to initiate a device cloud with the second computing device. In other instances, the first computing device may receive a request from the second computing device itself to initiate a device cloud with the second computing device. In still other instances, the first computing device may receive a request from one or more other computing devices to initiate a device cloud with the second computing device.

In step 1415, the first computing device may determine, based on one or more policies and device state information, whether the device cloud can be initiated with the second computing device. For example, the first computing device may analyze and/or otherwise evaluate device state information associated with the first computing device and/or device state information associated with the second computing device in view of one or more mobile device management policies (which may, e.g., define certain circumstances in which a device cloud may be initiated, where such circumstances may be determined based on such device state information). In addition, the device state information that is analyzed and/or otherwise evaluated may include any and/or all of the types of device state information discussed herein, including information about applications that are present on the computing device(s), network connections that are used by the computing device(s), and/or location information associated with the computing device(s).

In some embodiments, determining whether the device cloud can be initiated may include providing state information to one or more policy management servers and receiving management information from the one or more policy management servers. For example, in determining whether the device cloud can be initiated (e.g., in step 1415), the first computing device and/or the MDM agent running on the computing device may provide state information (which may, e.g., include at least some of the state information being monitored by the MDM agent loaded in step 1405) to one or more policy management servers by connecting to, and subsequently sending state information to, the one or more policy management servers. The one or more policy management servers may, for instance, be operated and/or controlled by an enterprise that is distributing and/or otherwise implementing the one or more policies which are used in determining whether the device cloud can be initiated between the first computing device and the second computing device. Additionally or alternatively, the one or more policy management servers may be configured to analyze state information (which, e.g., may be received from one or more MDM agents on one or more devices) and generate management information (which, e.g., may then be provided to, and subsequently received by, the one or more MDM agents on one or more devices). For example, after providing the state information to the one or more policy management servers, the first computing device and/or the MDM agent running on the first computing device may receive management information from the one or more policy management servers, and such management information may be generated by the one or more policy management servers based on the provided state information. In some instances, the management information may include one or more commands to be executed by the first computing device and/or by the MDM agent. For example, the management information may include one or more commands that, when executed, cause the first computing device and/or the MDM agent to allow or prohibit the device cloud with the second computing device and/or impose one or more other restrictions on the device cloud. In other instances, the management information may include one or more policy updates. For example, the management information may include one or more policy updates that reflect one or more new and/or updated policies to be applied to the first computing device and/or the device cloud.

In some embodiments, at least one policy of the one or more policies (which, e.g., are used in determining whether the device cloud can be initiated) may be received from a policy management server. For example, before determining whether the device cloud can be initiated with the second computing device, the first computing device and/or the MDM agent running on the first computing device may receive one or more policies from a policy management server, and the one or more received policies may, for instance, define specific circumstances in which a device cloud may be permitted to be initiated and/or may be prohibited from being initiated with specific devices. After receiving such policies from such a policy management server (which may, e.g., be operated and/or controlled by an enterprise that is implementing the policies), the first computing device and/or the MDM agent running on the first computing device then may use at least one policy of the one or more received policies in determining whether the device cloud can be initiated (e.g., by evaluating the device state information in view of the at least one policy).

In some embodiments, the first computing device may be configured to execute a mobile device management agent that is configured to monitor state information associated with the first computing device, and determining whether the device cloud can be initiated with the second computing device may be based on at least some of the state information monitored by the mobile device management agent. For example, the first computing device may be executing and/or may be configured to execute an MDM agent (which, e.g., may be initialized in step 1405, as discussed above), and in determining whether the device cloud can be initiated with the second computing device, at least some of the state information that is monitored by the MDM agent may be evaluated. In some instances, such state information may, for example, be evaluated by the first computing device itself in determining whether the device cloud can be initiated. In other instances, the state information may be evaluated by one or more policy management servers, as discussed below.

In particular, in one or more arrangements, the mobile device management agent may be configured to provide at least some of the monitored state information to one or more policy management servers (which may, e.g., be configured to remotely analyze the state information and/or provide one or more commands back to the first computing device based on the analysis of the state information). In addition, the mobile device management agent may be further configured to receive one or more commands from the one or more policy management servers based on the state information provided to the one or more policy management servers. For example, after providing state information to the one or more policy management servers, the mobile device management agent running on the first computing device may receive one or more commands that include information indicating whether the first computing device can initiate a device cloud with the second computing device. In other words, the one or more policy management servers may remotely evaluate the state information provided by the first computing device, determine based on this state information whether the first computing device can initiate a device cloud with the second computing device in view of one or more mobile device management policies (which may, e.g., define circumstances, as reflected by the state information, in which a device cloud may be established with specific devices), and subsequently provide information back to the first computing device that includes the results of this determination (e.g., indicating whether the first computing device can or cannot initiate a device cloud with the second computing device).

If it is determined, in step 1415, that the device cloud cannot be initiated with the second computing device, then in step 1420, the first computing device may generate a notification message. For example, in step 1420, the first computing device may generate a notification message indicating that the device cloud cannot be initiated and/or may cause the generated notification message to be displayed.

On the other hand, if it is determined, in step 1415, that the device cloud can be initiated with the second computing device, then in step 1425, the first computing device may establish a connection to the second computing device to initiate the device cloud. For example, in step 1425, the first computing device may establish a connection to the second computing device to initiate the device cloud, similar to how such a connection may be established to initiate a device cloud in the examples discussed above (e.g., as discussed above with respect to step 710).

In step 1430, the first computing device may configure the second computing device based on the one or more policies and the device state information. For example, in configuring the second computing device based on the one or more policies and the device state information, the first computing device may impose certain restrictions on the types of information that can be shared with and/or accessed by the second computing device, specific restrictions on the types of network connections that can be used by the second computing device during the device cloud, and/or other specific configuration settings. Depending on the one or more policies and the current device state information, different restrictions and/or settings may be imposed by the first computing device upon the second computing device.

In step 1435, the first computing device may enforce at least one policy of the one or more policies on the device cloud. For example, in enforcing at least one policy of the one or more policies on the device cloud, the first computing device may allocate specific roles to itself and/or to the second computing device in the device cloud (e.g., as discussed above).

In some embodiments, enforcing the at least one policy may include allowing at least a portion of an application being executed on the first computing device to be executed on the second computing device. For example, in enforcing one or more policies, the first computing device may allow certain functions of and/or aspects of a specific application that is being executed on the first computing device to be executed on the second computing device. In an example where the application being executed on the first computing device is a videoconferencing application, enforcing the one or more policies may thus involve the first computing device allowing camera functions and/or other video capture functions of the application to be executed on the second computing device, while other functions of the application are executed on the first computing device.

In some embodiments, enforcing the at least one policy includes restricting at least a portion of an application being executed on the first computing device to being executed on the second computing device. For example, in enforcing the one or more policies, the first computing device may prevent certain functions of and/or aspects of a specific application from being executed on the first computing device or the second computing device. In an example where the application being executed on the first computing device is a confidential records management application, enforcing the one or more policies may thus involve the first computing device allowing records viewing functions of the application to be executed on the second computing device, while prevent records editing functions of the application from being executed on the second computing device (and/or, e.g., restricting such editing functions to being executed only on the first computing device).

As illustrated above, various aspects of the disclosure relate to providing mobile device management functionalities. In other embodiments, however, the concepts discussed herein can be implemented in any other type of computing device (e.g., a desktop computer, a server, a console, a set-top box, etc.). Thus, although the subject matter has been described in language specific to structural features and/or methodological acts, it is to be understood that the subject matter defined in the appended claims is not necessarily limited to the specific features or acts described above. Rather, the specific features and acts described above are described as some example implementations of the following claims.

What is claimed is:

1. A method, comprising:
monitoring, by a mobile device management agent on a mobile computing device, state information associated with the mobile computing device;
providing, by the mobile device management agent, at least some of the monitored state information to one or more policy management servers;
applying, by the mobile device management agent, one or more policies to application tunneling functionalities on the mobile computing device based on the monitored state information to enable a dual-mode application on the mobile computing device to establish at least one tunnel to at least one enterprise resource, the dual-mode application having a managed mode which provides access to enterprise data obtained from the at least one enterprise resource via the at least one tunnel and in which one or more management policies are enforced on the dual-mode application, and the dual-mode application having an unmanaged mode which limits access to the enterprise data and in which the one or more management policies are not enforced on the dual-mode application;
receiving, by the mobile device management agent, from the one or more policy management servers, management information that comprises one or more commands generated by the one or more policy management servers based on the at least some of the monitored state information received from the mobile device management agent on the mobile computing device, the one or more commands comprising at least one command configured to cause the mobile device management agent to selectively disable the application tunneling functionalities for the dual-mode application on the mobile computing device; and
selectively disabling, by the mobile device management agent, the application tunneling functionalities for the dual-mode application on the mobile computing device based on the at least one command.

2. The method of claim 1, wherein monitoring the state information comprises one or more of: identifying one or more applications that are present on the mobile computing device; identifying one or more network connections that are used by the mobile computing device; or determining current location information for the mobile computing device.

3. The method of claim 1, wherein applying the one or more policies to the application tunneling functionalities on the mobile computing device comprises restricting content that is exchangeable by the dual-mode application with the at least one enterprise resource via the at least one tunnel.

4. The method of claim 3, wherein restricting the content that is exchangeable by the dual-mode application with the at least one enterprise resource comprises preventing at least one specific type of data from being exchanged via the at least one tunnel based on the monitored state information.

5. The method of claim 1, wherein applying the one or more policies to the application tunneling functionalities on the mobile computing device comprises restricting operations that are performable by the dual-mode application with the at least one enterprise resource via the at least one tunnel.

6. The method of claim 5, wherein restricting the operations that are performable by the dual-mode application with the at least one enterprise resource comprises preventing, based on the monitored state information, one or more write operations from being performed on one or more enterprise resources accessed via the at least one tunnel.

7. The method of claim 1, wherein the management information further comprises one or more policy updates.

8. The method of claim 1, wherein at least one policy of the one or more policies defines one or more circumstances in which an application tunnel can be established from the mobile computing device to a specific enterprise resource.

9. The method of claim 1, wherein at least one policy of the one or more policies defines one or more circumstances in which the application tunneling functionalities on the mobile computing device are selectively disabled for a specific application on the mobile computing device.

10. The method of claim 1, wherein at least one command of the one or more commands included in the management information is configured to cause the mobile device management agent to disable the managed mode of the dual-mode application.

11. The method of claim 10, wherein the dual-mode application is configured to access data in a secure data container when operating in the managed mode, and the dual-mode application is configured to access data in an unsecured data container when operating in the unmanaged mode.

12. A mobile computing device, comprising:
at least one processor; and
memory storing computer-readable instructions that, when executed by the at least one processor, cause the mobile computing device to:
monitor, via a mobile device management agent on the mobile computing device, state information associated with the mobile computing device;
provide, via the mobile device management agent, at least some of the monitored state information to one or more policy management servers;

apply, via the mobile device management agent, one or more policies to application tunneling functionalities on the mobile computing device based on the monitored state information to enable a dual-mode application on the mobile computing device to establish at least one tunnel to at least one enterprise resource, the dual-mode application having a managed mode which provides access to enterprise data obtained from the at least one enterprise resource via the at least one tunnel and in which one or more management policies are enforced on the dual-mode application, and the dual-mode application having an unmanaged mode which limits access to the enterprise data and in which the one or more management policies are not enforced on the dual-mode application;

receive, via the mobile device management agent, from the one or more policy management servers, management information that comprises one or more commands generated by the one or more policy management servers based on the at least some of the monitored state information received from the mobile device management agent on the mobile computing device, the one or more commands comprising at least one command configured to cause the mobile device management agent to selectively disable the application tunneling functionalities for the dual-mode application on the mobile computing device; and selectively disable, via the mobile device management agent, the application tunneling functionalities for the dual-mode application on the mobile computing device based on the at least one command.

13. The mobile computing device of claim 12, wherein monitoring the state information comprises one or more of: identifying one or more applications that are present on the mobile computing device; identifying one or more network connections that are used by the mobile computing device; or determining current location information for the mobile computing device.

14. The mobile computing device of claim 12, wherein applying the one or more policies to the application tunneling functionalities on the mobile computing device comprises restricting content that is exchangeable by the dual-mode application with the at least one enterprise resource via the at least one tunnel.

15. The mobile computing device of claim 12, wherein applying the one or more policies to the application tunneling functionalities on the mobile computing device comprises restricting operations that are performable by the dual-mode application with the at least one enterprise resource via the at least one tunnel.

16. The mobile computing device of claim 12, wherein the management information further comprises one or more policy updates.

17. One or more non-transitory computer-readable media having instructions stored thereon that, when executed, cause a mobile computing device to:
monitor, via a mobile device management agent on the mobile computing device, state information associated with the mobile computing device;
provide, via the mobile device management agent, at least some of the monitored state information to one or more policy management servers;
apply, via the mobile device management agent, one or more policies to application tunneling functionalities on the mobile computing device based on the monitored state information to enable a dual-mode application on the mobile computing device to establish at least one tunnel to at least one enterprise resource, the dual-mode application having a managed mode which provides access to enterprise data obtained from the at least one enterprise resource via the at least one tunnel and in which one or more management policies are enforced on the dual-mode application, and the dual-mode application having an unmanaged mode which limits access to the enterprise data and in which the one or more management policies are not enforced on the dual-mode application;
receive, via the mobile device management agent, from the one or more policy management servers, management information that comprises one or more commands generated by the one or more policy management servers based on the at least some of the monitored state information received from the mobile device management agent on the mobile computing device, the one or more commands comprising at least one command configured to cause the mobile device management agent to selectively disable the application tunneling functionalities for the dual-mode application on the mobile computing device; and
selectively disable, via the mobile device management agent, the application tunneling functionalities for the dual-mode application on the mobile computing device based on the at least one command.

18. The one or more non-transitory computer-readable media of claim 17, wherein monitoring the state information comprises one or more of: identifying one or more applications that are present on the mobile computing device; identifying one or more network connections that are used by the mobile computing device; or determining current location information for the mobile computing device.

19. The one or more non-transitory computer-readable media of claim 17, wherein applying the one or more policies to the application tunneling functionalities on the mobile computing device comprises restricting content that is exchangeable by the dual-mode application with the at least one enterprise resource via the at least one tunnel.

20. The one or more non-transitory computer-readable media of claim 17, wherein the management information further comprises one or more policy updates.

* * * * *